United States Patent
Negishi et al.

(10) Patent No.: US 7,333,711 B2
(45) Date of Patent: Feb. 19, 2008

(54) DATA DISTRIBUTION APPARATUS AND METHOD, AND DATA DISTRIBUTION SYSTEM

(75) Inventors: Shinji Negishi, Kanagawa (JP); Hideki Koyanagi, Kanagawa (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 1795 days.

(21) Appl. No.: 09/878,288

(22) Filed: Jun. 12, 2001

(65) Prior Publication Data

US 2002/0015577 A1 Feb. 7, 2002

(30) Foreign Application Priority Data

Jun. 14, 2000 (JP) .......................... P2000-179000

(51) Int. Cl.
*H04N 5/91* (2006.01)
(52) U.S. Cl. .............................. 386/68; 725/88; 725/94
(58) Field of Classification Search ................. 386/46, 386/68, 86, 95, 124; 725/88, 94
See application file for complete search history.

(56) References Cited

U.S. PATENT DOCUMENTS

| | | | | |
|---|---|---|---|---|
| 5,027,400 A | * | 6/1991 | Baji et al. .................... | 725/116 |
| 5,914,941 A | * | 6/1999 | Janky .......................... | 370/313 |
| 7,269,839 B2 | * | 9/2007 | Negishi et al. ............... | 725/88 |

* cited by examiner

*Primary Examiner*—Thai Q. Tran
*Assistant Examiner*—Mishawn Dunn
(74) *Attorney, Agent, or Firm*—Rader Fishman & Grauer PLLC; Ronald P. Kananen

(57) ABSTRACT

A special playback request made by a user is input into a special playback controller. Transmission data to be transmitted to a decoding terminal based on the special playback request and insertion data to be transmitted together with the transmission data are read from a data storage unit. Used bits of the read transmission data and insertion data which occupy a vbv buffer are detected by a vbv delay detector. A stuffing insertion unit adds extra data to the read insertion data based on the detected used bits so as to adjust the data size of the insertion data. The resulting transmission data and the insertion data are selectively output by a switch based on the type of special playback operation indicated in the special playback request. The output transmission data and the insertion data are then transmitted to the decoding terminal.

39 Claims, 22 Drawing Sheets

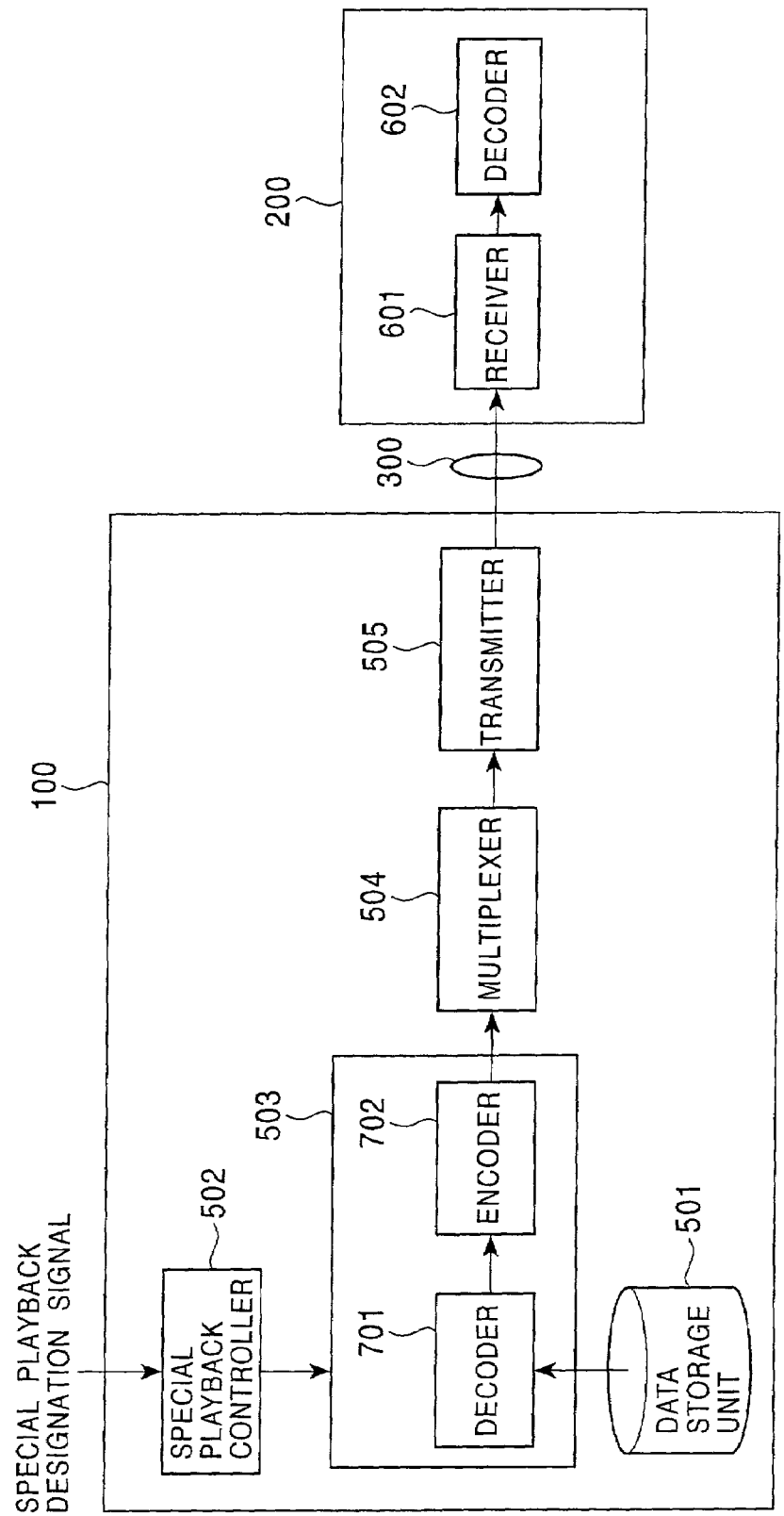

DATA DISTRIBUTION APPARATUS AND METHOD, AND DATA DISTRIBUTION SYSTEM

BACKGROUND OF THE INVENTION

1. Field of the Invention

The present invention relates to a data distribution apparatus and method, and a data distribution system, for distributing multimedia data, such as moving picture data, via a network and for allowing a receiving terminal to play back the received multimedia data in a special mode.

2. Description of the Related Art

A conventional data distribution system for compressing and storing multimedia data, such as video data and audio data, and distributing such multimedia data via a transmission medium, and allowing a decoding terminal, which serves as a data receiving terminal, to receive, decode, and display the multimedia data is configured, such as that shown in FIG. 19. For a simple representation, a data distribution system for distributing only video data is shown in FIG. 19.

The conventional data distribution system shown in FIG. 19 is formed of a server 100 for transmitting video data and a decoding terminal 200 for receiving the video data transmitted from the server 100. In this data distribution system, the server 100 and the decoding terminal 200 are connected via a transmission medium 300, such as a communication line, and the video data is transmitted and received between the server 100 and the decoding terminal 200 via the transmission medium 300.

The server 100 includes a data storage unit 101 for storing video data, a special playback controller 102, and a transmitter 103, which transmits the video data to the decoding terminal 200.

The decoding terminal 200 includes a receiver 201, a decoder 202, and a special playback controller 203. The receiver 201 receives the video data transmitted from the transmitter 103 of the server 100. The decoder 202 decodes the received video data and outputs it to a display unit (not shown) so as to present the content of the video data to a user.

In the above-configured data distribution system, when performing a special playback operation, such as a fast-forward playback operation or an interrupting operation (pause), the user of the decoding terminal 200 inputs a special playback designation signal into the special playback controller 203. In response to this signal, the special playback controller 203 sends a special playback request to the special playback controller 102 of the server 100.

Then, the special playback controller 102 supplies a control signal S102 indicating the special playback request to the transmitter 103 according to the special playback request sent from the decoding terminal 200. The transmitter 103 then reads the special playback video data S101 from the data storage unit 101 according to the special playback request and sends it to the decoding terminal 200 via the transmission medium 300.

When the above-described data distribution system is employed in a home network, video data encoded in conformance with, for example, ISO/IEC13818-2 (MPEG-2video), is used. It is defined in ISO/IEC13818-2 that the video data must be encoded so as not to cause an overflow or an underflow in a decoder buffer. The decoder buffer is referred to as a vbv buffer conforming to the MPEG standards.

More specifically, as shown in FIG. 20, it is necessary to encode each piece of video data with an individual decode time stamp (DTS) so as not to overflow the vbv buffer in excess of its buffer size (vbv_buffer_size) or cause an underflow in the vbv buffer. The video data is input into the vbv buffer at the transmission rate of the video data (indicated by the locus slope of the used portion of the vbv buffer) and is output from the vbv buffer in accordance with a decoding time (DTS).

For example, the n-th video frame (in FIG. 20, indicated as video frame n) having a data size S(n) is read from the vbv buffer at a decoding time DTS(n). The video data to be read from the vbv buffer should be written into the vbv buffer before the decoding time. The period from the input of the video frame data until the decoding time of the video frame is referred to as a "vbv delay (vbv_delay)", which is contained in the header of the encoded video frame data.

There are two types of video frame encoding methods in compliance with ISO-IEC13818-2. In one method, Intra pictures (I-pictures) are encoded using data present in the frame itself. In the other method, Bidirectionally predictive pictures (B-pictures) and Predictive pictures (P-pictures) are encoded by utilizing an inter-frame motion prediction. In a conventional data distribution system, I-pictures to be encoded without using inter-frame motion prediction are used as the above-described special playback video data. The special playback data is formed of I-pictures, which are regularly contained in normal playback video data, and is used for a special playback operation.

In a conventional data distribution system, video data to be transmitted is packetized by using a transport stream (TS), which is defined in, for example, ISO/IEC13818-1 (MPEG-2 system), and the resulting packets are multiplexed with another type of data, such as audio data. According to ISO-IEC13818-1, a decoder model, such as that shown in FIG. 21, is used for decoding the TS.

The decoder model shown in FIG. 21 is formed of a switch 401 for selectively outputting a video packet from the input TS, a transport buffer (TB) 402, a multiplexing buffer (MB) 403, an elementary buffer (EB) 404, a video decoder (VD) 405, a reorder buffer 406, and a switch 407. A video packet is selected from the input TS by the switch 401 and is sent to the transport buffer 402 at the input rate, and further to the video decoder 405 via the multiplexing buffer 403 and the elementary buffer 404. The video packet is then decoded in the video decoder 405 and is output as video data.

In the above-configured decoder model, the buffer size of each buffer is determined, and the data transfer rate between buffers is also defined.

The elementary buffer 404 is equivalent to the vbv buffer used for video data. It is defined in ISO/IEC13818-1 that the video data must be packetized so as not to cause an overflow or an underflow in each buffer.

The transmission data, such as a TS, is transmitted by using protocols compatible with the transmission medium 300. For example, a TS which satisfies the standards of ISO/IEC13818-1 can be transmitted by an IEEE-1394 cable which conforms to IEEE-1394 standards according to a technique defined in the "Digital Interface for consumer audio/video equipment" of IES61883. According to MPEG-2-TS-over-1394, a TS which conforms to the MPEG2 standards is transmitted according to IEEE-1394 standards. It is proposed that the above-mentioned MPEG-2-TS-over-1394 be used in a home network for distributing the content stored in a server to a client, such as a television set, installed in a room.

In performing a special playback operation in the above-described conventional data distribution system, the server 100 transmits special video data prepared for a special playback operation via the transmission medium 300. When, for example, a fast-forward playback operation is performed as the special playback operation, video data formed of only I-pictures conforming to ISO-IEC13818-2 is transmitted. The video data formed of only I-pictures may cause an overflow or an underflow in the vbv buffer. Thus, special transmission data, which is different from normal playback data, should be transmitted. Also, the special type of decoding terminal 200 is required for performing a special playback operation according to the special data format.

As discussed above, when a fast-forward playback operation is performed, video data formed of only I-pictures conforming to ISO/IEC13818-2 is transmitted. In this case, special playback video data different from the normal playback video data must be prepared in the data storage unit 101 of the server 100.

However, in order to transmit a TS via an IEEE-1394 cable according to a technique defined in IEC61883, such a TS must be defined in ISO/IEC13818-1.

If the special playback data is transmitted in a special distribution data format, the special decoding terminal 200 in accordance with such a distribution data format is required. For example, video data formed of only I-pictures conforming to ISO/IEC13818-2 is different from a normal playback video stream, which is encoded to satisfy the standards of the vbv buffer, and may cause an overflow or an underflow in the vbv buffer. Accordingly, there is a strong demand for a data distribution method which does not require the special server 100 and the special decoding terminal 200.

Additionally, according to a special data distribution method for a special playback operation, the decoding terminal 200 must have a decoding function for performing processing, not only for the normal playback operation, but also for the special playback operation, which makes the configuration of the decoding terminal 200 complicated. For example, when video data formed of only I-pictures conforming to ISO/IEC13818-2, which may cause an underflow in the vbv buffer, is transmitted to the decoding terminal 200 for performing a fast-forward playback operation, the decoding terminal 200 must deal with the following situation. If, even at a decoding time of a certain picture, the input data of such a picture is not entirely received, the decoding terminal 200 must use the data of, for example, the previous picture, in place of the missing data.

Moreover, in a home network system, a plurality of decoding terminals 200 may be connected to the server 100. In this case, a data transmission method usable in simply constructed decoding terminals 200 is demanded. However, such a method is not available according to a conventional technique.

To overcome the above-described drawback, a data distribution system shown in FIG. 22 can be considered. In this data distribution system, the server 100 is formed of a data storage unit 501, a special playback controller 502 for receiving a special playback designation signal, a data converter 503 for generating special playback data according to a special playback control signal based on the special playback designation signal received from the special playback controller 502, a multiplexer 504, and a transmitter 505. The decoding terminal 200 is formed of a receiver 601 for receiving transmission data from the server 100 via the transmission medium 300, and a decoder 602 for decoding the special playback data received from the receiver 601 and for displaying it on a display unit (not shown) so as to present the data to a user.

In the above-configured data distribution system, the data converter 503 includes a decoder 701 for receiving the special playback control signal from the special playback controller 502 and also reading video data from the data storage unit 501, and an encoder 702 for converting the data decoded in the decoder 701.

The decoder 701 reads the designated video data from the data storage unit 501 based on the special playback control signal from the special playback controller 502 according to a reading method optimal for the type of special playback operation. For example, in response to the special playback control signal indicating a request of a fast-forward playback operation, the decoder 701 reads the video data from the data storage unit 501 by skipping B-pictures, which are not required for decoding.

The decoder 701 then decodes the read video data and supplies it to the encoder 702 as a decoded video signal. The decoded video signal reflects the special playback operation since it has been selectively read from the data storage unit 501.

The encoder 702 encodes the decoded video signal and outputs it to the multiplexer 504 as special playback video data. The special playback video data output from the encoder 702 is optimal for the type of special playback operation. For example, when the video data output from the decoder 701 is encoded in compliance with ISO/IEC13818-2, the special playback video data output from the encoder 702 satisfies the standards of ISO/IEC13818-2.

In the above-described data distribution system, even when a special playback operation is performed, the special playback data is converted into a video data format similar to that of a normal playback operation. This obviates the need for special receiving or decoding processing in the decoding terminal 200, and also, a special playback controller is not required for the decoding terminal 200.

However, in the data converter 503 of the server 100 of the data distribution system shown in FIG. 22, video data stored in the data storage unit 501 is decoded and re-encoded by using the decoder 701 and the encoder 702, which increases the processing load imposed by data conversion, and may also deteriorate the image quality. Additionally, with an increased processing delay caused by data conversion, the period from when the special playback designation signal is input by the user until when the content of the special playback operation is displayed on a display unit of the decoding terminal 200 also becomes increased.

SUMMARY OF THE INVENTION

Accordingly, in view of the above background, it is an object of the present invention to provide a data distribution apparatus and method, and a data distribution system, for converting data into special playback data without the need for decoding or re-encoding the data.

In order to achieve the above object, according to one aspect of the present invention, there is provided a data distribution apparatus including a receiver for receiving a special playback request from an external source. A data storage unit stores transmission data to be transmitted to a playback apparatus and insertion data to be transmitted to the playback apparatus together with the transmission data. A reader reads the transmission data and the insertion data from the data storage unit based on the special playback request received by the receiver. A used-bit detector detects used bits of the transmission data and the insertion data which are read by the reader and which occupy a virtual buffer used for controlling the amount of encoding. An insertion-data adjusting unit adds extra data to the insertion data read by the reader based on the used bits detected by the used-bit detector so as to adjust the data size of the insertion data. A switch selectively outputs the transmission data whose used bits which occupy the virtual buffer are detected by the used-bit detector and the insertion data whose data size is adjusted by the insertion-data adjusting unit based on the type of special playback operation indicated in the special playback request received by the receiver. A transmitter transmits the transmission data and the insertion data output from the switch to the playback apparatus.

According to another aspect of the present invention, there is provided a data distribution method including the steps of: receiving a special playback request from an external source; reading transmission data to be transmitted to a playback apparatus and insertion data to be transmitted to the playback apparatus together with the transmission data from a data storage unit in response to the received special playback request; detecting used bits of the transmission data and the insertion data which occupy a virtual buffer used for controlling the amount of encoding; adjusting the data size of the insertion data by adding extra data to the read insertion data based on the detected used bits; selectively outputting the transmission data whose used bits which occupy the virtual buffer are detected and the insertion data whose data size is adjusted based on the type of special playback operation indicated in the received special playback request; and transmitting the output transmission data and the insertion data to the playback apparatus.

According to still another aspect of the present invention, there is provided a data distribution system including a data distribution apparatus for distributing data and a receiving terminal for receiving the data from the data distribution apparatus. The distribution apparatus and the receiving terminal are connected via a transmission medium. The data distribution apparatus includes: a receiver for receiving a special playback request from a user; a data storage unit for storing transmission data to be transmitted to the receiving terminal and insertion data to be transmitted to the receiving terminal together with the transmission data; a reader for reading the transmission data and the insertion data from the data storage unit based on the special playback request received by the receiver; a used-bit detector for detecting used bits of the transmission data and the insertion data which are read by the reader and which occupy a virtual buffer used for controlling the amount of encoding; an insertion-data adjusting unit for adding extra data to the insertion data read by the reader based on the used bits detected by the used-bit detector so as to adjust the data size of the insertion data; a switch for selectively outputting the transmission data whose used bits which occupy the virtual buffer are detected by the used-bit detector and the insertion data whose data size is adjusted by the insertion-data adjusting unit based on the type of special playback operation indicated in the special playback request received by the receiver; and a transmitter for transmitting the transmission data and the insertion data output from the switch to the receiving terminal. The receiving terminal includes: a receiver for receiving the transmission data and the insertion data from the transmitter based on the special playback request as special playback data; and a decoder for decoding the special playback data received by the receiver.

According to the present invention, the transmission data whose used bits are detected and the insertion data whose data size is adjusted are selectively output based on the type of special playback operation indicated in the received special playback request. The output transmission data and the insertion data are transmitted to a receiving terminal. Thus, it is not necessary to decode or encode the special playback video data to be transmitted to the receiving terminal. The configuration of the data distribution apparatus can be simplified, and a processing delay before transmitting the video data can be inhibited. Additionally, the image quality can be maintained.

BRIEF DESCRIPTION OF THE DRAWINGS

FIG. 22 is a block diagram illustrating another conventional data distribution system.

DESCRIPTION OF THE PREFERRED EMBODIMENTS

The present invention is described in detail below with reference to the accompanying drawings through illustration of a preferred embodiment.

Figure 1:
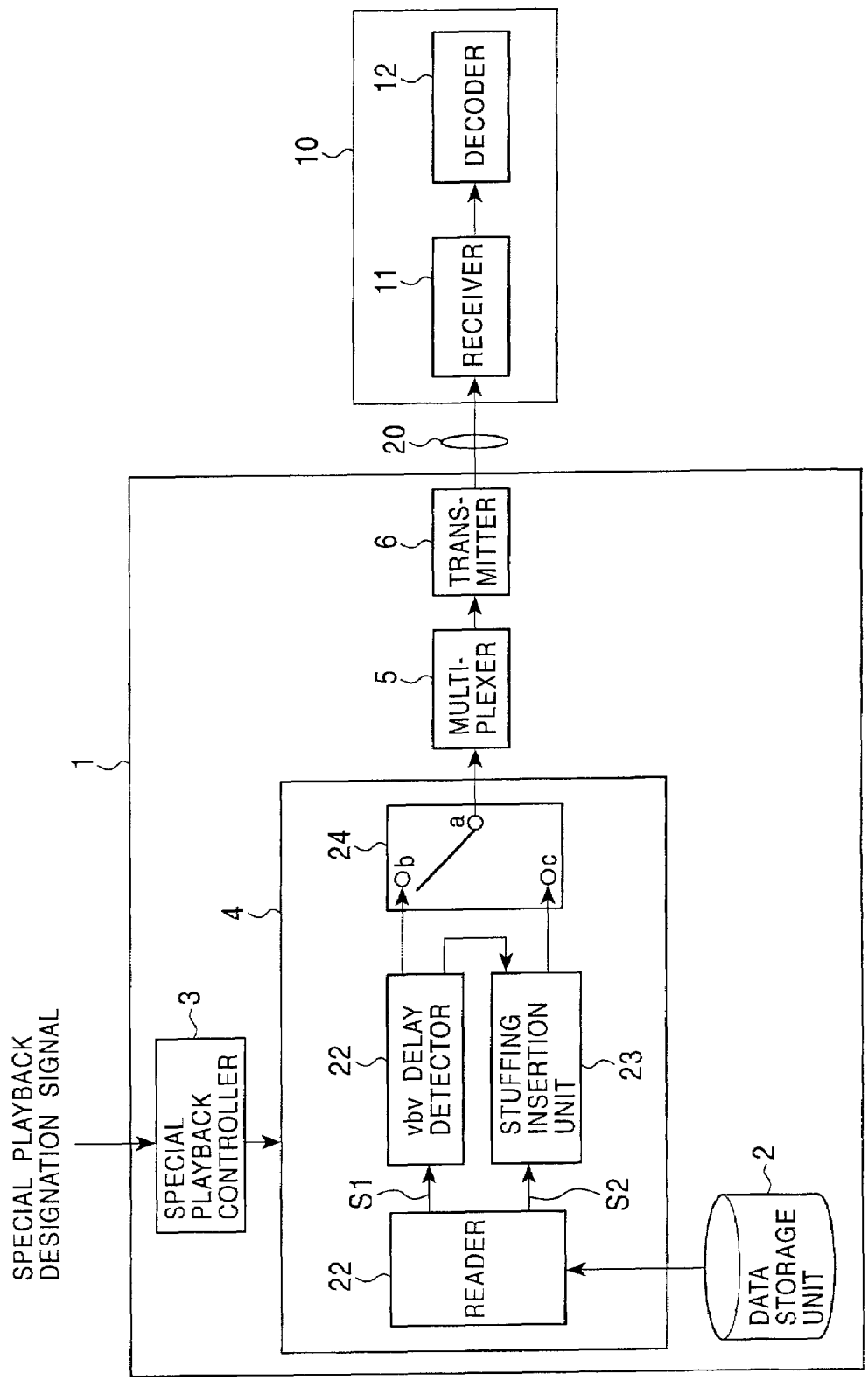
FIG. 1 is a block diagram illustrating a data distribution system according to an embodiment of the present invention.

A data distribution system constructed in accordance with the present invention shown in FIG. 1 is formed of a server 1 for distributing stored data and a decoding terminal 10 connected to the server 1 via a transmission medium 20.

The server 1 includes a data storage unit 2 for storing data, a special playback controller 3, a data converter 4, a multiplexer 5, and a transmitter 6.

The data storage unit 2 stores video data and insertion data to be transmitted from the server 1 to the decoding terminal 10 via the transmission medium 20. The video data stored in the data storage unit 2 is normal playback video data, which is temporally continuous. The data storage unit 2 outputs the video data and the insertion data to the data converter 4 in response to a request from the data converter 4.

The insertion data stored in the data storage unit 2 may be repeat pictures in compliance with MPEG2 standards. The repeat pictures are pictures indicating that video data which provides predictions to other pictures is repeated by forming all the macro blocks by skipping macro blocks. In other words, the repeat pictures are the same as video data for predicting other pictures.

In this embodiment, only the video data and the insertion data are stored in the data storage unit 2. However, other types of multimedia data, such as still image data, audio data, text data, and graphics data, may be stored.

A special playback designation signal indicating a request to perform a special playback operation is input into the special playback controller 3 by a user. The special playback designation signal indicates the type of special playback operation, such as a fast-forward playback or frame advance playback operation, and designates the video data stored in the data storage unit 2. The special playback controller 3 supplies a special playback control signal indicating the type of special playback operation and the designated video data to the data converter 4 based on the special playback designation signal.

According to the special playback control signal, the data converter 4 reads the designated video data from the data storage unit 2, and performs data conversion on the read video data according to the type of special playback operation. In this case, the data converter 4 converts the video data into special playback data reflecting the type of special playback operation while reading the video data from the data storage unit 2. The data converter 4 supplies the special playback data to the multiplexer 5.

The multiplexer 5 multiplexes the special playback data from the data converter 4 or the video data from the data storage unit 2 as required, and supplies the multiplexed data to the transmitter 6.

More specifically, the multiplexer 5 multiplexes the data from the data converter 4 in a data format compatible with the transmission medium 20 when the data is formed of a plurality of types of data, such as video data and audio data.

The transmitter 6 converts the special playback video data from the multiplexer 5 into a format compatible with the transmission medium 20, and sends it to the decoding terminal 10 via the transmission medium 20 as transmission data.

The decoding terminal 10 includes a receiver 11 connected to the server 1 via the transmission medium 20 and a decoder 12.

The receiver 11 receives the transmission data from the transmitter 6 of the server 1 via the transmission medium 20. The receiver 11 converts the transmission data in a format processable by the decoder 12, and supplies the converted data to the decoder 12 as the special playback video data.

The decoder 12 decodes the special playback video data received from the receiver 11 and outputs the decoded data to a display unit (not shown) so as to display the content of the special playback video data.

The configuration of the above-described data converter 4 is as follows.

The data converter 4 is formed of a reader 21 for reading the video data and the insertion data from the data storage unit 2, a vbv delay detector 22, a stuffing insertion unit 23, and a switch 24.

The reader 21 reads the designated video data from the data storage unit 2 according to the special playback control signal from the special playback controller 3, and also reads the insertion data from the data storage unit 2. The reader 21 selectively reads only the video data required for the special playback operation from the designated video data according to the type of special playback operation indicated in the special playback control signal. The reader 21 outputs the read video data S1 to the vbv delay detector 22, and outputs the read insertion data S2 to the stuffing insertion unit 23.

The vbv delay detector 22 detects a vbv delay indicating the locus of the used bits of a vbv buffer, the vbv delay being encoded for each video data. The vbv delay detector 22 outputs the video data from the reader 21 to the switch 24 and also supplies the detected vbv delay to the stuffing insertion unit 23.

The stuffing insertion unit 23 adjusts the data size of the insertion data based on the vbv delay from the vbv delay detector 22 so that the locus of the used bits of the vbv buffer becomes continuous. The stuffing insertion unit 23 adjusts the data size of the insertion data by inserting stuffing data into the insertion data. The stuffing insertion unit 23 outputs the adjusted insertion data to the switch 24.

For example, since the data size of a repeat picture is smaller than that of an I-picture, the stuffing insertion unit 23 adjusts the data size of the insertion data by adding the repeat picture as stuffing data to the insertion data so as not to cause an overflow or an underflow in the vbv buffer. The data size of the repeat picture is determined by referring to the vbv delay of the video data used for an editing operation. The insertion data may be formed of a plurality of repeat pictures.

The switch 24 switches between the video data from the vbv delay detector 22 and the insertion data from the stuffing insertion unit 23, and outputs the selected data to the multiplexer 5 as the special playback data in accordance with the special playback control signal from the special playback controller 3. The switch 24 receives the video data via an input terminal b and outputs it via an output terminal a, or receives the insertion data via an input terminal c and outputs it via the output terminal a, thereby outputting the video data or the insertion data as the special playback video data.

A description is now given of a technique for inserting the insertion data by the switch 24 when switching the video data from video data A to video data B required for performing a special playback operation.

Figure 2:
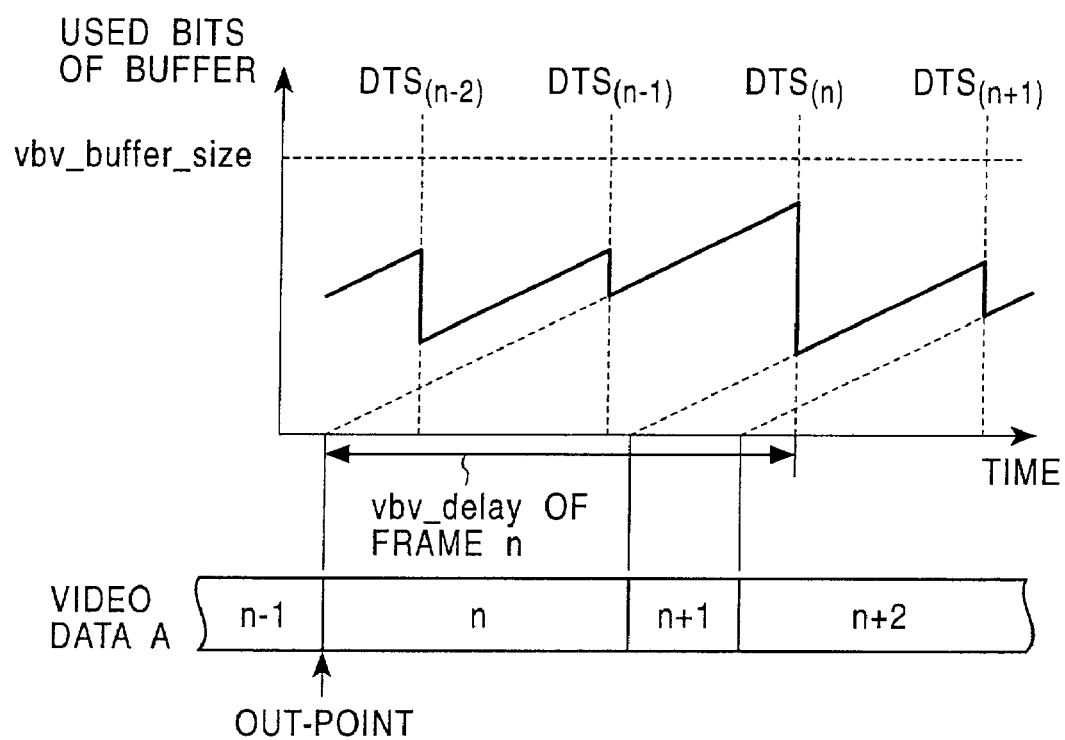
FIG. 2 illustrates the locus of video data A in a vbv buffer.
Figure 3:
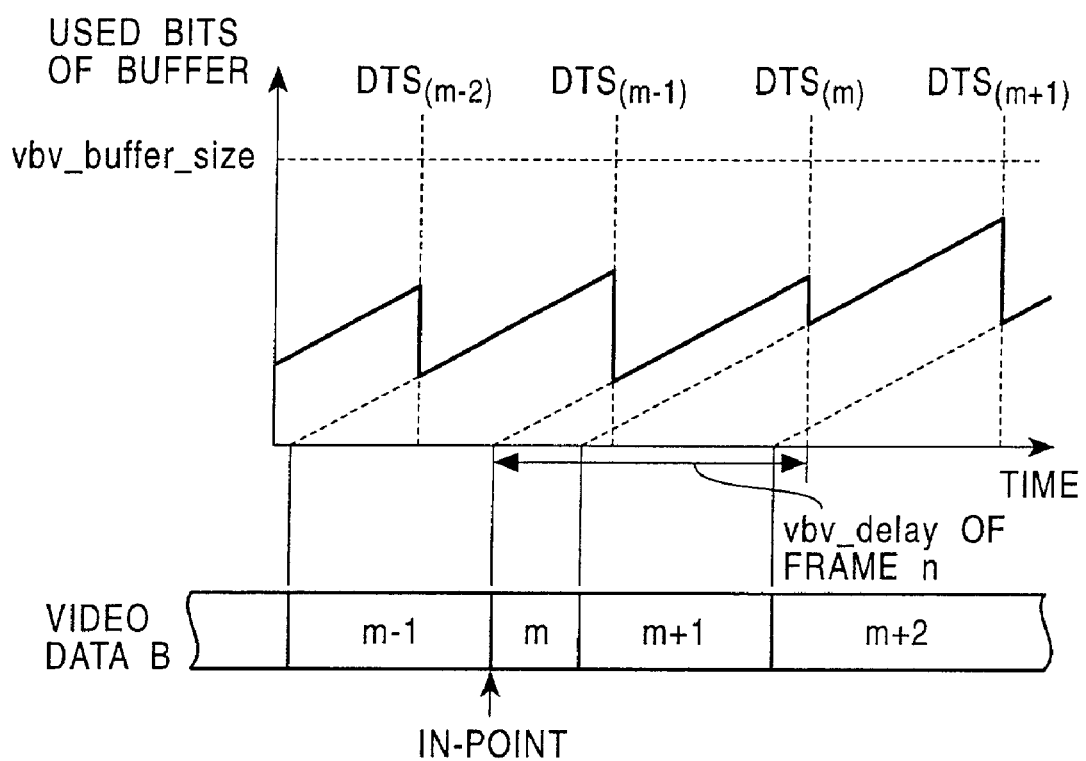
FIG. 3 illustrates the locus of video data B in a vbv buffer.

FIG. 2 illustrates the locus of the video data A in the vbv buffer, and FIG. 3 illustrates the locus of the video data B in the vbv buffer. It is now assumed that the video data A starting from frame n is switched into the video data B starting from frame m. That is, when frame n−1 of the video data A is an out-frame, the end point of frame n−1 becomes the out-point, and when frame m of the video data B is an in-frame, the start point of frame m becomes the in-point.

Figure 4:
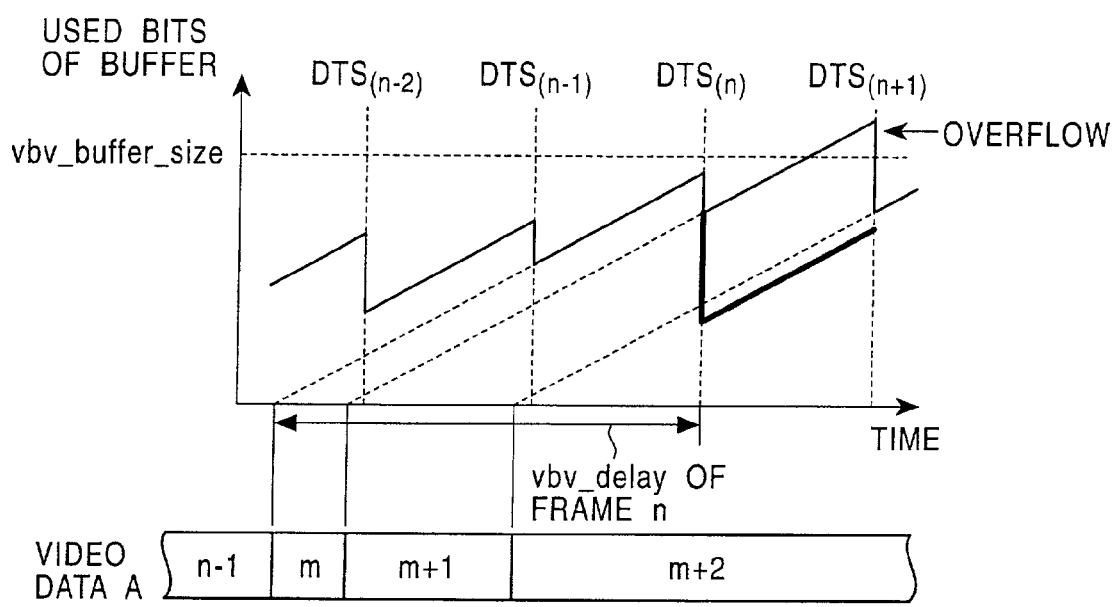
FIG. 4 illustrates the locus of used bits of a vbv buffer when video data A is switched into video data B.

As shown in FIGS. 2 and 3, the vbv delay of frame n is different from that of frame m. Accordingly, when the video data A is switched into the video data B by the switch 24, as shown in FIG. 4, the locus of the video data A in the vbv buffer does not match that of the video data B in the vbv buffer, thereby causing an overflow or an underflow in the vbv buffer.

Figure 5:
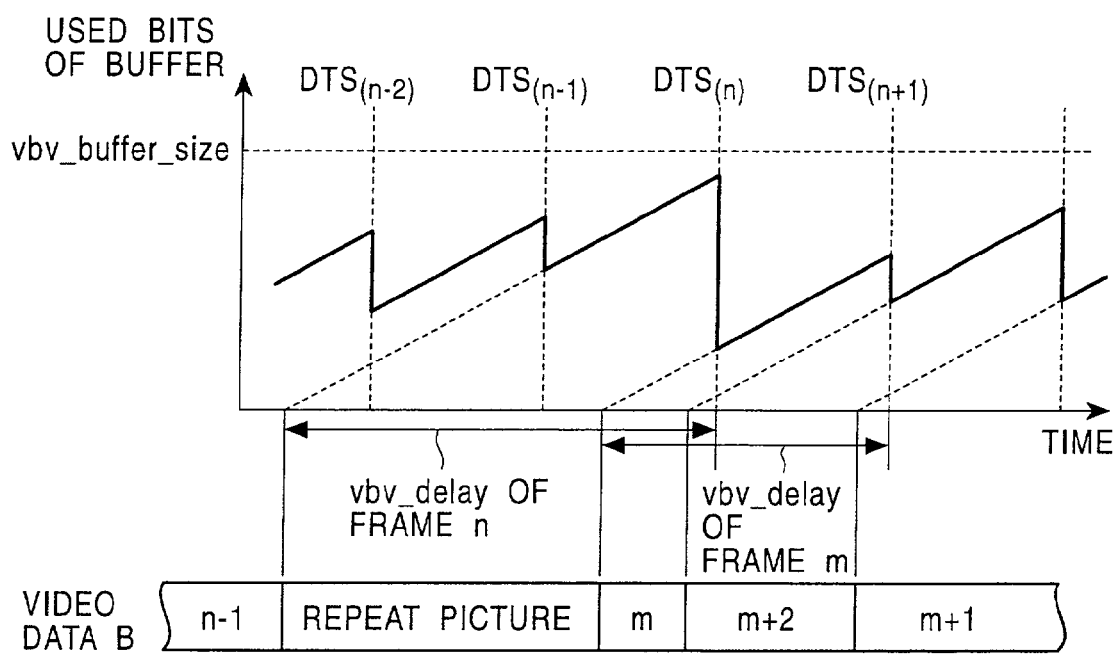
FIG. 5 illustrates the locus of used bits of a vbv buffer when repeat pictures are inserted between video data A and video data B.

To deal with this problem, the data converter 4 inserts the insertion data between frame n and frame m, as shown in FIG. 5, when switching the video data in order to maintain the matching of the locus of the used bits in the vbv buffer, thereby preventing an overflow or an underflow in the vbv buffer before and after switching the video data.

Thus, before switching the video data by the switch 24, the vbv delay detector 22 detects the vbv delay of the video data before and after switching the video data so that the locus of the used bits of the vbv buffer becomes continuous. The stuffing insertion unit 23 then inserts repeat pictures as the stuffing data so that the locus of the used bits of the vbv buffer becomes continuous, thereby adjusting the data size of the insertion data. Then, the switch 24 adjusts the type and the number of repeat pictures forming the insertion data to be inserted between the video data A and the video data B, thereby determining the data size of the insertion data. As a result, the special playback data which does not cause an overflow or an underflow in the vbv buffer is output from the switch 4 to the multiplexer 5.

A description is given below of the processing performed by the data converter 4 when a special playback designation signal designating an interrupting operation is input into the special playback controller 3.

Figure 6:
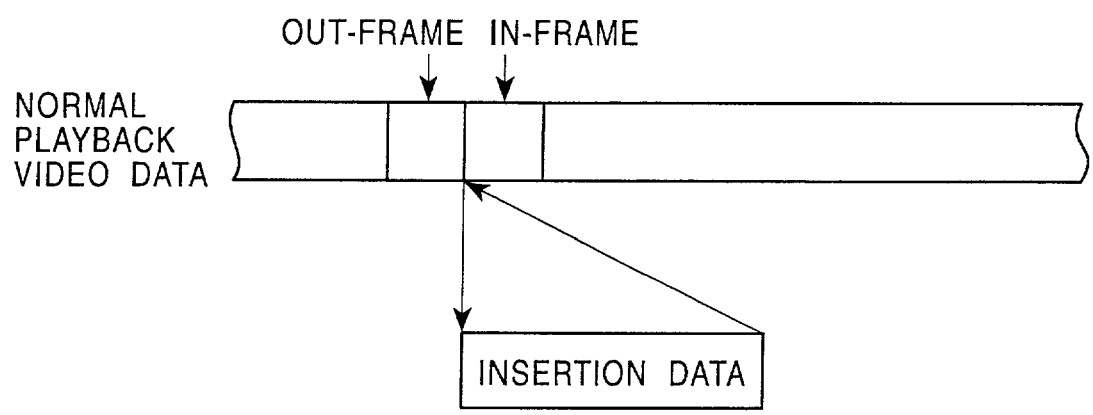
FIG. 6 illustrates processing executed by a data converter to perform an interrupting operation.

When a special playback control signal indicating that an interrupting operation is to be performed is input from the special playback controller 3, the data converter 4 inserts insertion data after the out-frame, as shown in FIG. 6. When the interrupting operation is released, the data converter 4 re-starts reading the video data from the in-frame.

Figure 7:
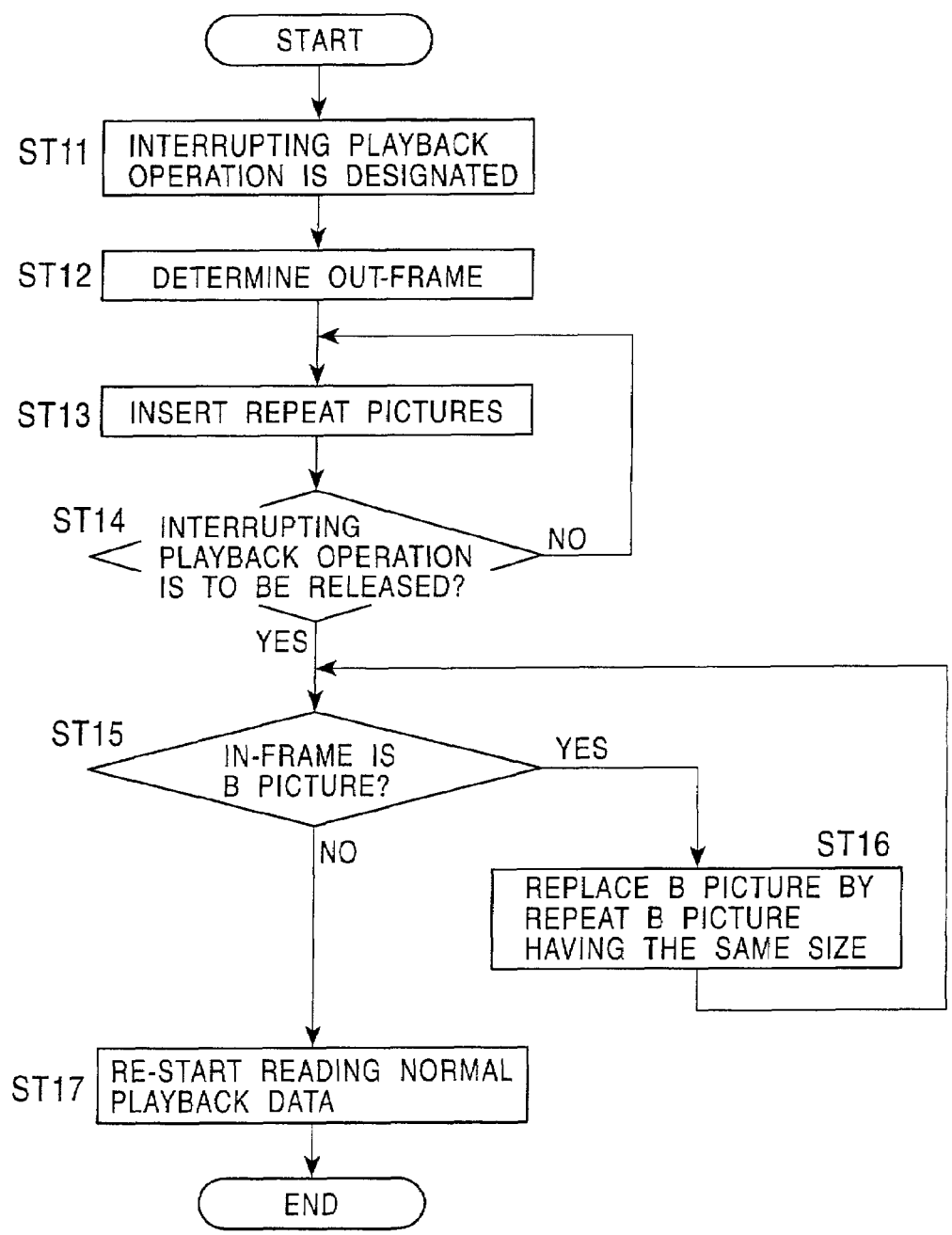
FIG. 7 is a flow chart illustrating a procedure of the processing taken by the data converter when the interrupting operation is performed.

The procedure of the above-described processing taken by the data converter 4 is shown in FIG. 7. In step ST11, the data converter 4 receives a special playback control signal designating an interrupting operation while reading normal playback video data by using the reader 21 and transmitting it to the decoding terminal 10. Then, in step ST12, the data converter 4 determines the out-frame. In this case, the reader 21 desirably selects the out-frame whose type is an I-picture or a B-picture which is continuous from the I-picture, thereby maintaining the image quality during the interrupting operation at a high level.

Subsequently, in step ST13, insertion data is inserted in accordance with the period of the interrupting operation. It is then determined in step ST14 whether a special playback control signal indicating that the interrupting operation is to be released is input. If the outcome of step ST14 is no, the data converter 4 continues to insert the insertion data until the above-described special playback control signal is input.

In step ST13, the reader 21 reads the repeat pictures from the data storage unit 2 as the insertion data to be displayed on the decoding terminal 10 during the interrupting operation, and outputs them to the stuffing insertion unit 23. For preventing an overflow or an underflow in the vbv buffer, the stuffing insertion unit 23 adds stuffing data to the repeat pictures output from the reader 21 so that the data size becomes equal to a value obtained by multiplying the data rate with the display period of the video frames, and outputs the resulting insertion data to the switch 24. During the interrupting operation, the switch 24 outputs the repeat pictures from the stuffing insertion unit 23 to the multiplexer 5.

The stuffing insertion unit 23 determines the type of repeat pictures so that the number of continuous B-pictures from the out-frame becomes the same as that when the normal playback operation is performed, thereby maintaining the display order of the pictures before the out-frame.

If it is found in step ST14 that the interrupting operation is to be released, the process proceeds to step ST15 in which the reader 21 determines whether the type of in-frame is a B-picture. If the in-frame is not a B-picture, the process proceeds to step ST17 in which the reader 21 restarts reading the normal playback data. The process is then completed. If the reader 21 determines in step ST15 that the in-frame is a B-picture, the process proceeds to step ST16 in which the correction processing is performed. This is repeated until it is found that the in-frame is not a B-picture.

Figure 8:
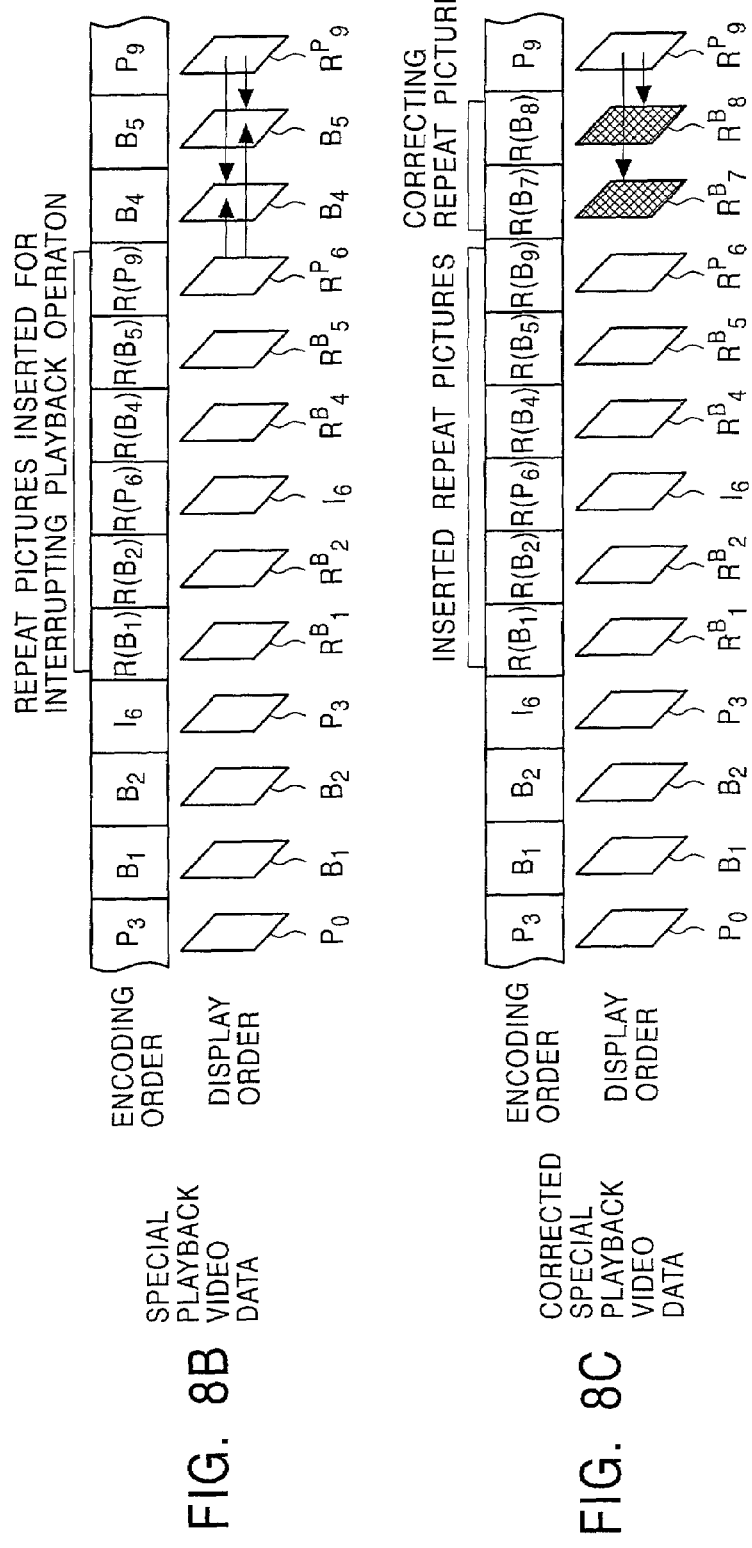
FIGS. 8A, 8B, and 8C illustrate correction processing conducted by the data converter when the interrupting operation is performed.

The above-described correction processing is discussed below in greater detail. It is now assumed that the normal playback video data arranged in the encoding order and the display order shown in FIG. 8A is interrupted. In FIGS. 8A, 8B, and 8C, it is determined that the arrows indicate the motion prediction directions, the frames to which the arrows are directed are pictures which use predictions from other pictures, and the frames from which the arrows are directed are pictures which provide predictions to other pictures.

In the normal playback video data shown in FIG. 8A, frame $I_6$ (the sixth I-picture to be displayed) is the out-frame, and frame $B_4$ is the in-frame. The frame immediately after the in-frame is a B-picture, and frames $B_4$ and $B_5$ are encoded by using predictions from frames $P_3$ and $I_6$.

FIG. 8B illustrates special playback video data in which repeat pictures $R(B_1)$ through $R(P_9)$ are inserted between frames $I_6$ and $B_4$ by the switch 24 for interrupting the normal playback operation. Frames $B_4$ and $B_5$ are decoded in the decoding terminal 10 by using predictions from repeat pictures $R(P_6)$ and $R(P_9)$. Originally, frames $B_4$ and $B_5$ would be decoded by using predictions from frames $P_3$ and $I_6$. In this case, since the picture $R(P_9)$ is a repeat picture, the decoded result obtained by using a prediction from the picture $R(P_9)$ is the same as that obtained by using a prediction from frame $I_6$. However, the decoded result obtained by using a prediction from frame $R(P_6)$ is not the same as that obtained by using a prediction from frame $P_3$. Thus, frames $B_4$ and $B_5$ cannot be correctly decoded.

Accordingly, in the correction processing in step ST16, the reader 21 inserts correcting repeat pictures so as to replace frames $B_4$ and $B_5$ by repeat B-pictures which use a prediction only from an upcoming frame ($R(P_9)$). As a result, frames $B_4$ and $B_5$ can be correctly decoded. More specifically, the reader 21 reads insertion data from the data storage unit 2 so that frames $B_4$ and $B_5$ can be replaced by repeat pictures $R(B_7)$ and $R(B_8)$, respectively, which use a prediction only from a repeat picture $R(P_9)$, as shown in FIG. 8C. This enables the decoding terminal 10 to correctly decode frames $B_4$ and $B_5$. Moreover, the stuffing insertion unit 23 inserts stuffing data into the correcting repeat pictures $R(B_7)$ and $R(B_8)$, thereby preventing an overflow or an underflow in the vbv buffer.

The video data may be encoded by an encoding method which makes the picture display period variable, as in the encoding method defined in ISO/IEC14496-2 (so-called MPEG-4video). When such video data is transmitted, the picture display period may be changed instead of inserting repeat pictures, thereby repeating special playback pictures. According to this modification, the interrupting operation can also be performed.

A description is now given of the processing performed by the data converter 4 when a special playback designation signal designating a fast-forward playback operation is input into the special playback controller 3.

Figure 9:
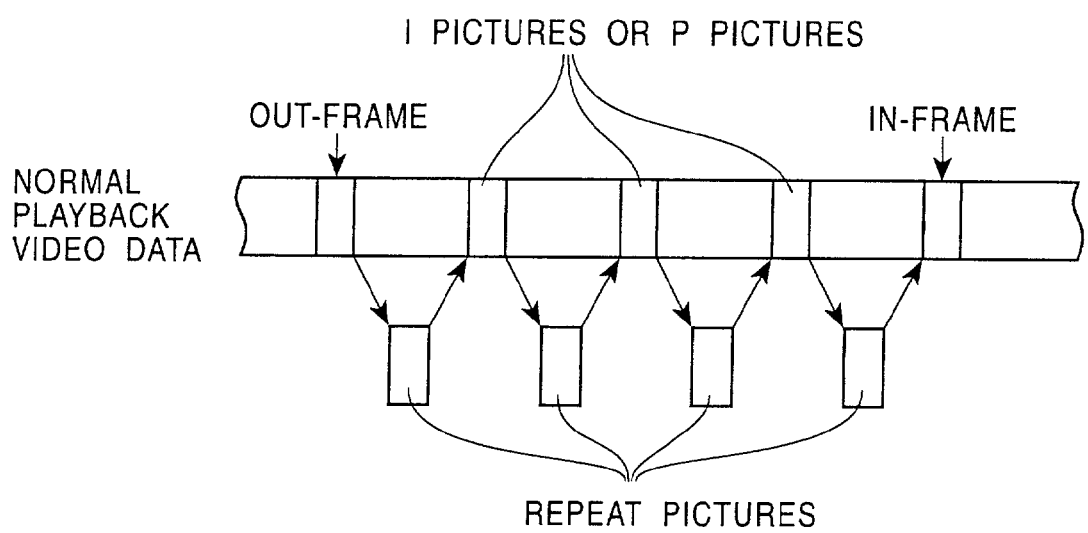
FIG. 9 illustrates processing executed by the data converter to perform a fast-forward playback operation.

When the data converter 4 receives a special playback control signal indicating that a fast-forward playback operation is to be performed from the special playback controller 3, the reader 21 selects and reads suitable I-pictures or P-pictures after the out-frame from the data storage unit 2, as shown in FIG. 9. The stuffing insertion unit 23 then inserts insertion data so as not to cause an overflow or an underflow in the vbv buffer. When a fast-forward playback operation is released, the data converter 4 returns to the in-frame of the normal playback video data.

Figure 10:
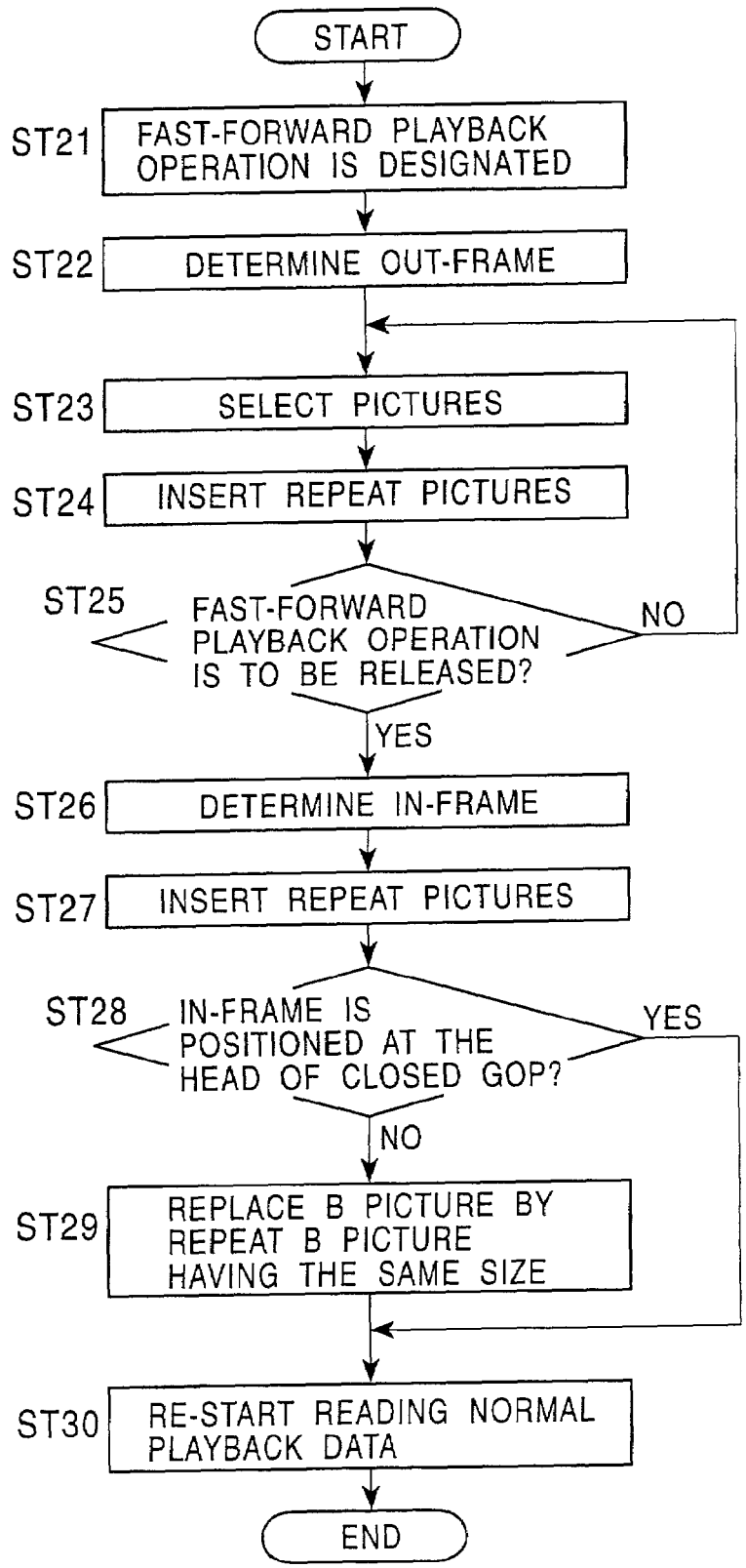
FIG. 10 is a flow chart illustrating a procedure of the processing taken by the data converter when the fast-forward playback operation is performed.

The procedure of the above-described processing taken by the data converter 4 is shown in FIG. 10. In step ST21, the data converter 4 receives a special playback control signal designating a fast-forward playback operation while reading the normal playback video data by using the reader 21 and transmitting it to the decoding terminal 10. Then, in step ST22, the data converter 4 determines the out-frame. In this case, the reader 21 desirably selects the out-frame whose type is an I-picture, thereby maintaining the image quality immediately after the fast-forward playback operation at a high level.

Then, in step ST23, the reader 21 selects and reads I-pictures or P-pictures used for a fast-forward playback operation from the normal playback video data stored in the data storage unit 2. As in the out-frame, by selecting the I-pictures, the image quality can be maintained at a high level even during the fast-forward playback operation. If the speed of the fast-forward playback operation is designated by the special playback control signal supplied from the special playback controller 3, the interval between the selected pictures can be adjusted, thereby achieving the designated speed.

In step ST24, the video data read in step ST23 is supplied from the reader 21 to the vbv delay detector 22, while the repeat pictures (insertion data) read by the reader 21 are supplied to the stuffing insertion unit 23. The vbv delay detector 22 detects a vbv delay by using the video data, and the stuffing insertion unit 23 inserts stuffing data into the repeat pictures based on the detected vbv delay so that the locus of the used bits of the vbv buffer can be continuous. The resulting video data and repeat pictures are then output to the switch 24. The switch 24 then inserts, as shown in FIG. 9, the repeat pictures and the stuffing data to the video data.

It is then determined in step ST25 whether a special playback control signal indicating that the fast-forward playback operation is to be released is input. If the outcome of step ST25 is no, the processing in steps ST23 and ST24 is repeated until the above-mentioned special playback control signal is input. If it is found in step ST25 that the fast-forward playback operation is to be released, the process proceeds to step ST26.

In step ST26, the reader 21 selects and reads an I-picture as the in-frame from the data storage unit 2, and supplies it to the vbv delay detector 22.

Then, in step ST27, the vbv delay detector 22 detects a vbv delay of the in-frame video data, and the stuffing insertion unit 23 inserts stuffing data based on the detected vbv delay so as to prevent an overflow or an underflow in the vbv buffer, and outputs the resulting repeat pictures to the switch 24.

It is then determined in step ST28 whether the selected in-frame video data is positioned at the head of a closed group of pictures (GOP) in the encoding order.

If the outcome of step ST28 is yes, the process proceeds to step ST30 in which the reader 21 re-starts reading the normal playback video data. The process is then completed.

Figure 11A:
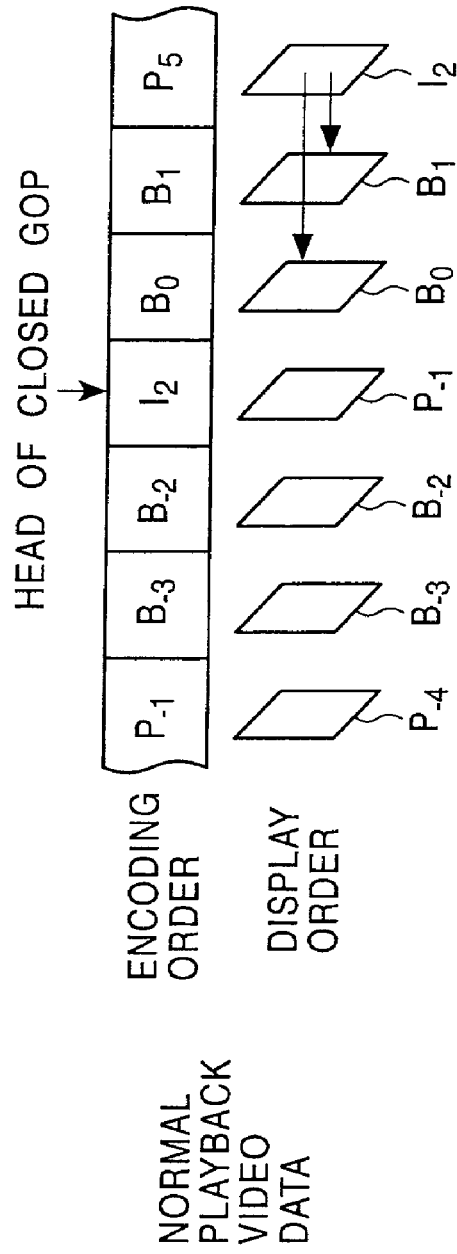
FIGS. 11A and 11B illustrate processing conducted by the data converter when the fast-forward operation is performed.
Figure 11B:
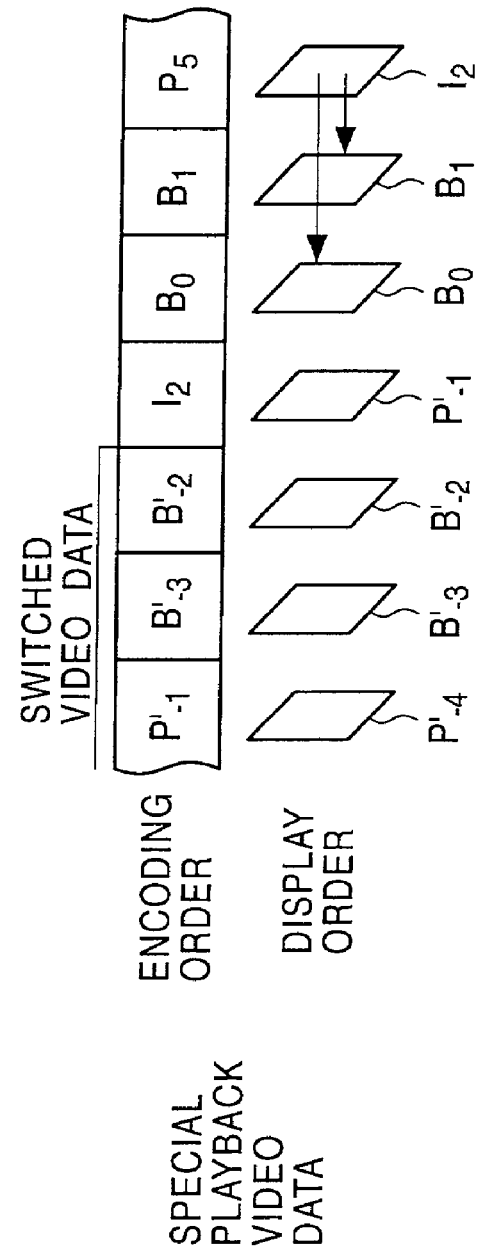

More specifically, when the fast-forward playback operation is released by using frame $I_2$ located at the head of the closed GOP as the in-frame, as shown in FIG. 11A, the video data can be decoded in the decoding terminal 10 without the need for inserting repeat pictures, as shown in FIG. 11B.

If it is found in step ST28 that the in-frame video data is not positioned at the head of a closed GOP in the encoding order, the process proceeds to step ST29 in which the corresponding frames are replaced by repeat pictures having the same size. Then, in step ST30, the reader 21 restarts reading the normal playback video data. The process is then completed.

Figure 12A:
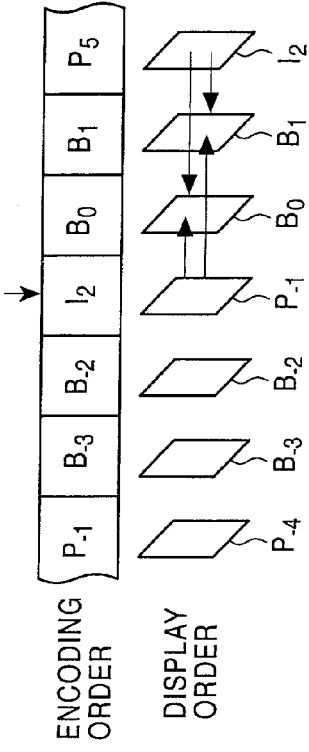
FIGS. 12A, 12B, and 12C illustrate correction processing conducted by the data converter when the fast-forward operation is performed.
Figure 12B:
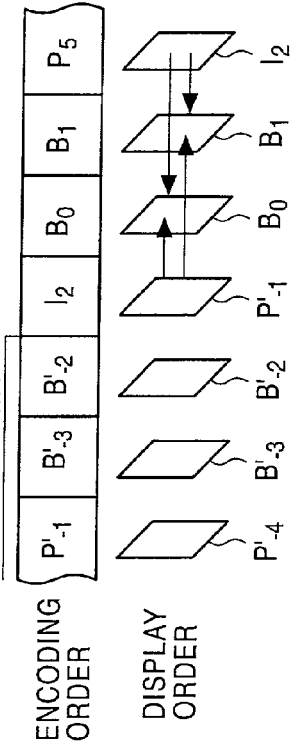
Figure 12C:
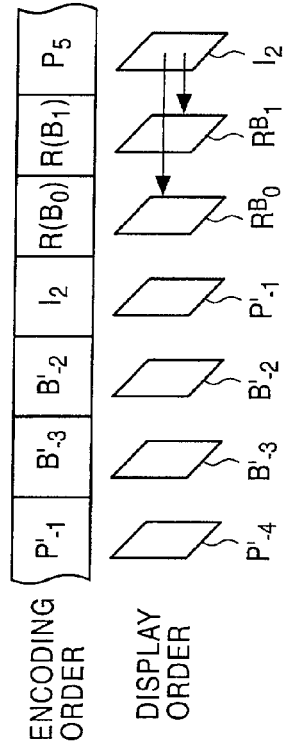

More specifically, when the fast-forward playback operation is to be released by using frame $I_2$, which is not located at the head of a closed GOP, as the in-frame, as shown in FIG. 12A, the B-pictures after the in-frame in the display order cannot be correctly decoded, as shown in FIG. 12B, since the picture which provides predictions to such B-pictures has been replaced by a special playback picture. Accordingly, the reader 21 replaces the B-pictures by repeat pictures $R(B_0)$ and $R(B_1)$ which use a prediction only from an upcoming frame. As a result, the B-pictures can be correctly decoded in the decoding terminal 10. For preventing an overflow or an underflow in the vbv buffer, the stuffing insertion unit 23 inserts stuffing data into the repeat pictures $R(B_0)$ and $R(B_1)$ so that the data sizes of the repeat pictures $R(B_0)$ and $R(B_1)$ are the same as those of the original pictures $B_0$ and $B_1$.

During the fast-forward playback operation, the processing in steps ST26 and ST27 may be performed in steps ST23 and ST24, respectively, unless the conditions set in step ST23 are different from those in step ST26, such as a condition that the in-frame should be selected so that it is positioned at the head of a closed GOP.

If the fast-forward playback operation is performed in a backward direction, the data converter 4 arranges the I-pictures selected in step ST23 in a temporally reverse order.

The processing performed by the data converter 4 when a special playback control signal designating a slow playback operation is input into the special playback controller 3 is discussed below.

Figure 13:
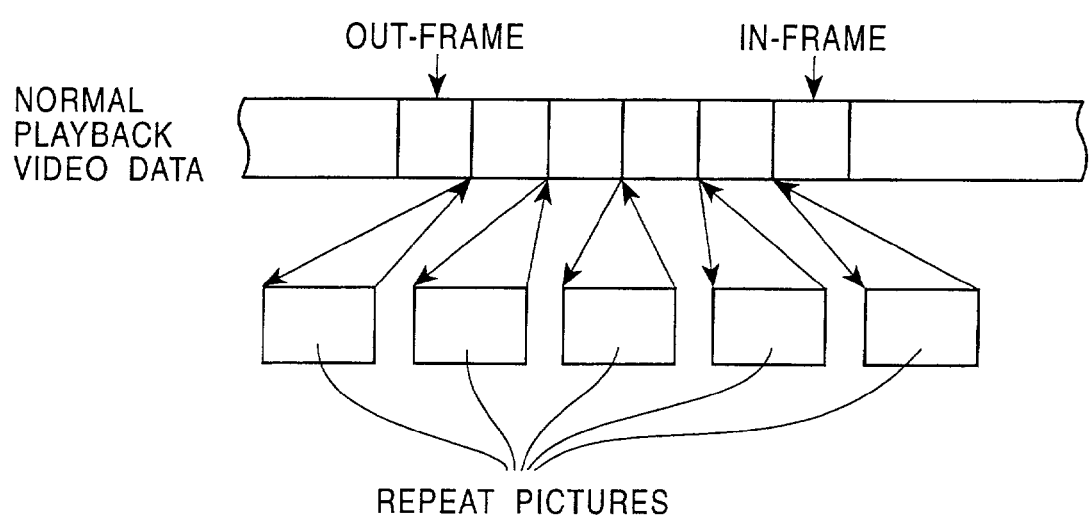
FIG. 13 illustrates processing executed by the data converter to perform a slow playback operation.

In response to a special playback control signal indicating that a slow playback operation is to be performed, the data converter 4 starts, as shown in FIG. 13, inserting repeat pictures from the out-frame between the frames of the normal playback video data. When the slow playback operation is released, the data converter 4 returns to the in-frame of the video data.

Figure 14:
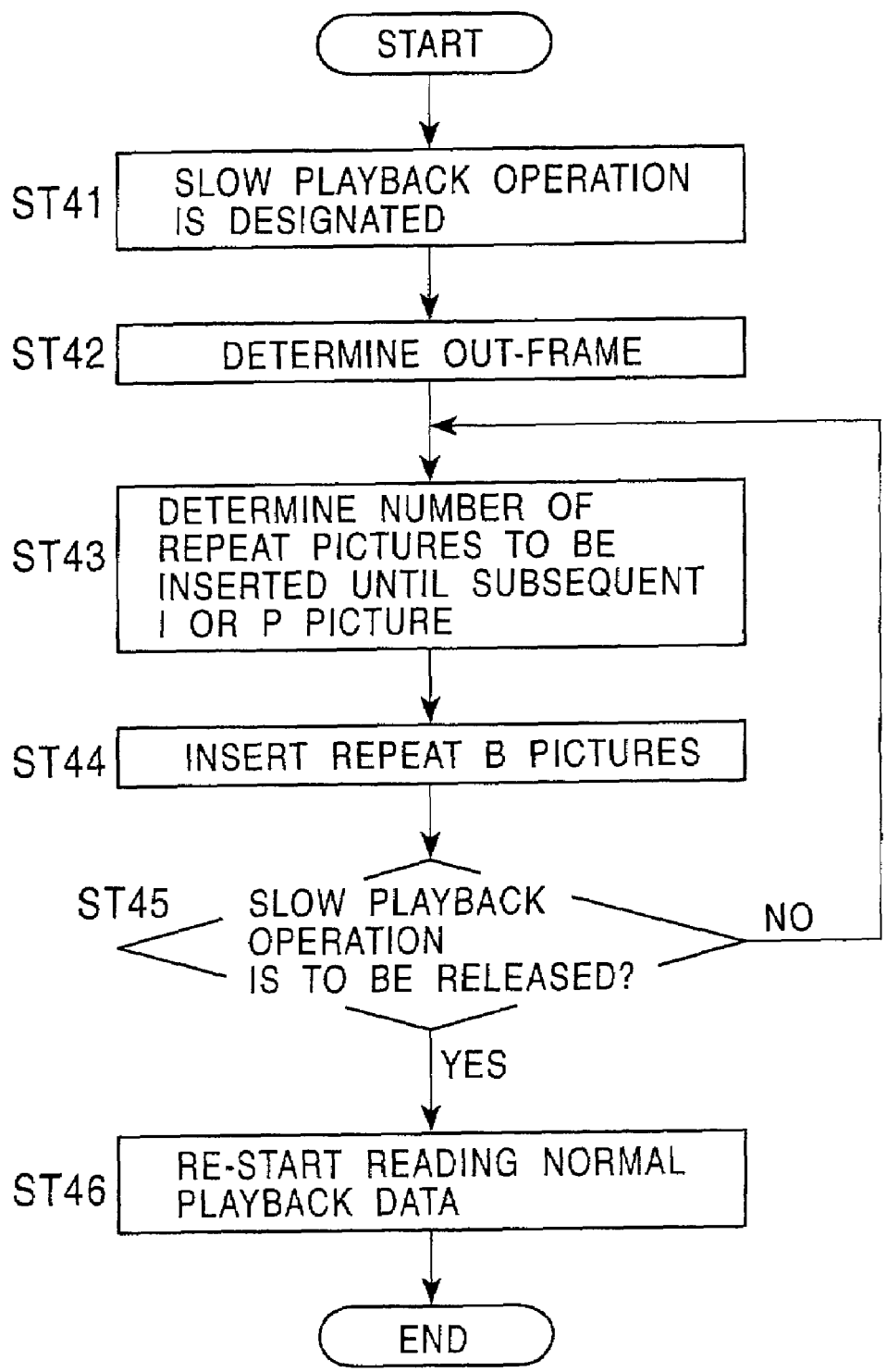
FIG. 14 is a flow chart illustrating a procedure of the processing taken by the data converter when the slow playback operation is performed.

The procedure of this processing taken by the data converter 4 is shown in FIG. 14. In step ST41, the data converter 4 receives a special playback control signal indicating a slow playback operation while reading the normal playback video data by using the reader 21 and transmitting it to the decoding terminal 10. Then, in step ST42, the data converter 4 determines the out-frame.

If the normal playback video data is a TS defined in ISO/IEC13818-1, display time information of an I-picture or a P-picture is sometimes encoded and transmitted before the picture data. In this case, by inserting the repeat pictures, the display time of an I-picture or a P-picture is changed. Accordingly, when the display time is encoded, the out-frame should be selected from an I-picture or a P-picture.

In step ST43, for determining the display time of the current I-picture or P-picture, the reader 21 determines the number of repeat pictures to be inserted until the subsequent I-picture or P-picture from starting the slow playback operation. If it is not necessary to encode the display time, the reader 21 does not have to determine the number of repeat pictures. The reader 21 controls the speed of the slow playback operation by the number of repeat pictures to be inserted.

Then, in step ST44, the switch 24 inserts the repeat B-pictures between the pictures of the normal playback video data, and then outputs the special playback video data to the multiplexer 5. In this case, the stuffing insertion unit 23 inserts stuffing data so that the data size of the repeat pictures to be inserted becomes equal to a value obtained by multiplying the data rate with the display period of the video frames, thereby preventing an overflow or an underflow in the vbv buffer. If the display time is encoded, the switch 24 performs control so that the slow playback operation is maintained until the repeat pictures having a number determined in step ST43 are completely inserted, thereby ensuring the precision of the encoded display time.

It is then determined in step ST45 whether a special playback control signal indicating that the slow playback operation is to be released is input from the special playback controller 3. If the outcome of step ST45 is yes, the process proceeds to step ST46 in which the reader 21 restarts reading the normal playback data. The process is then completed. If the result of step ST45 is no, the processing in steps ST43 and ST44 is repeated.

A description is given below of the processing performed by the data converter 4 when a special playback control signal designating a skipping playback operation is input into the special playback controller 3.

Figure 15:
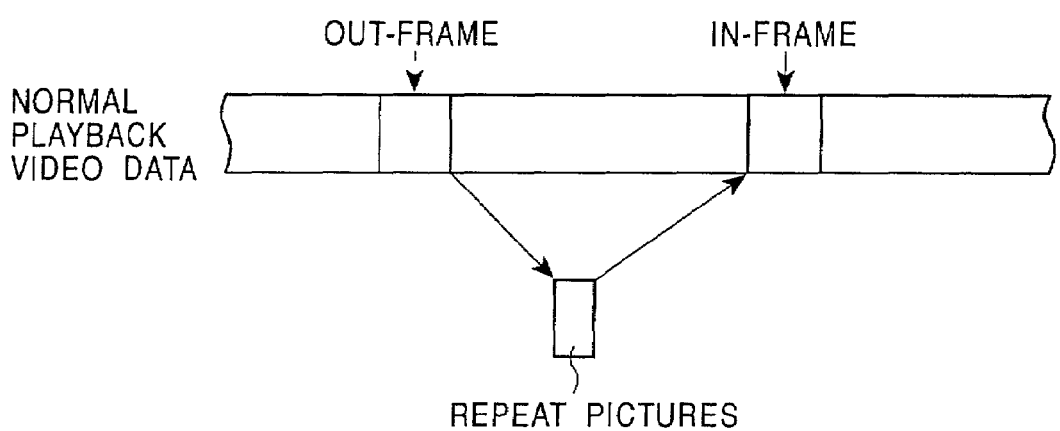
FIG. 15 illustrates processing executed by the data converter to perform a skipping playback operation.

In response to a special playback control signal indicating a skipping playback operation, the data converter 4 inserts, as shown in FIG. 15, repeat pictures into the frames of the normal playback video data after the out-frame, and then returns to the in-frame of the video data. That is, the server 1 plays back the normal playback video data by skipping from one frame to another frame.

Figure 16:
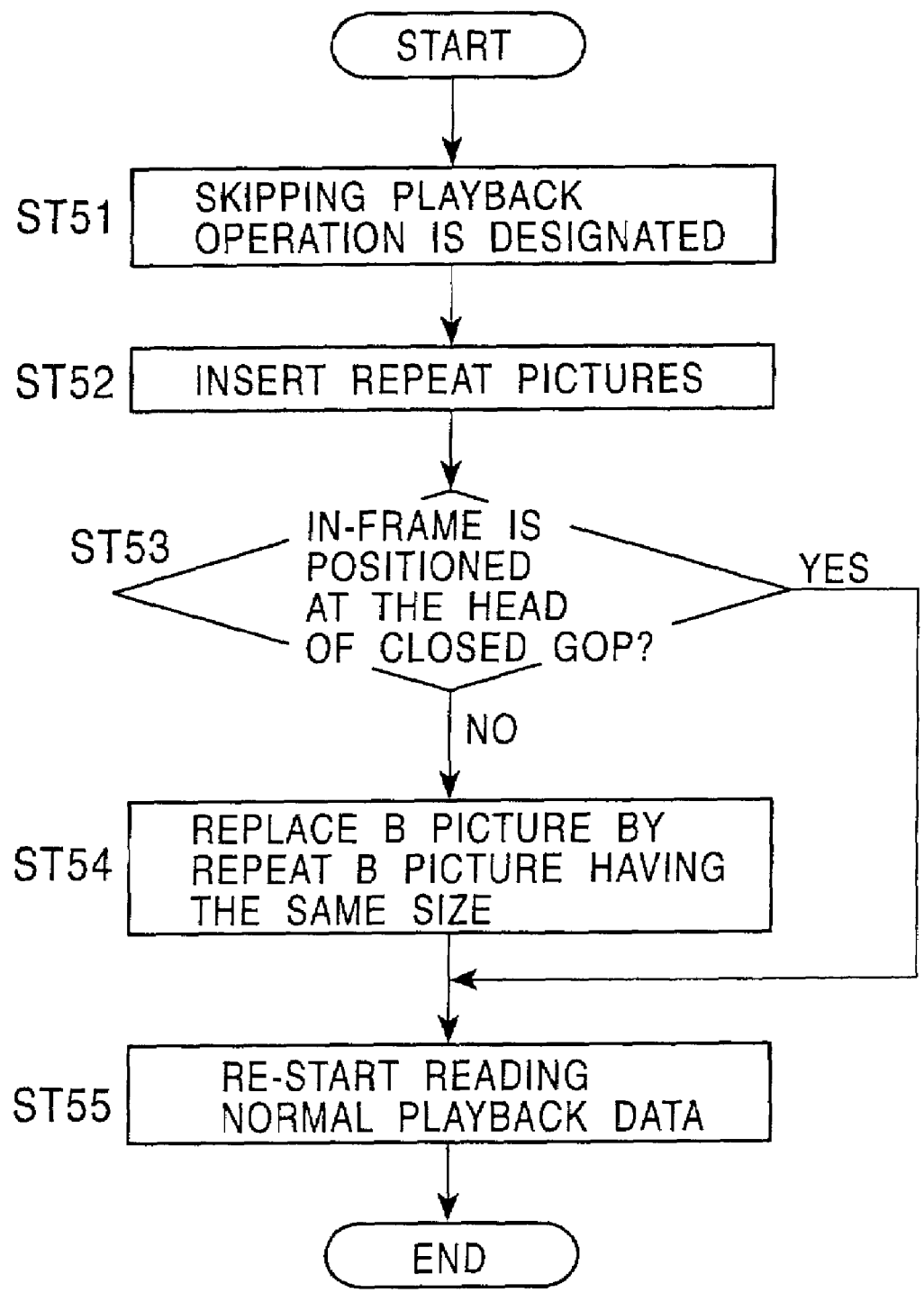
FIG. 16 is a flow chart illustrating a procedure of the processing taken by the data converter when the skipping playback operation is performed.

The procedure of this processing taken by the data converter 4 is shown in FIG. 16. In step ST51, the data converter 4 receives a special playback control signal designating a skipping playback operation while reading the normal playback video data by using the reader 21 and transmitting it to the decoding terminal 10. Then, the data converter 4 causes the vbv delay detector 22 to detect a vbv delay of the frame immediately after the out-frame and also a vbv delay of the in-frame. In this case, the reader 21 reads the frame immediately after the out-frame and the in-frame from the data storage unit 2 and supplies them to the vbv delay detector 22. The reader 21 also reads the repeat pictures from the data storage unit 2 and supplies them to the stuffing insertion unit 23.

Then, in step ST52, for preventing an overflow or an underflow in the vbv buffer, the stuffing insertion unit 23 inserts stuffing data based on the detected vbv delay so as to adjust the data size of the repeat pictures.

If the display time information prior to the out-frame is encoded and transmitted to the decoding terminal 10 before the video data, the server 1 determines the type of repeat pictures so that the number of continuous B-pictures after the out-frame is the same as that if the skipping playback operation is not performed, thereby maintaining the display order of the pictures before the out-frame.

The reader 21 then determines in step ST53 whether the in-frame video data read in step ST52 is positioned at the head of a closed GOP. If the outcome of step ST53 is no, the process proceeds to step ST54 in which the corresponding frames are replaced by repeat pictures having the same size, as in step ST29 shown in FIG. 10. Then, in step ST55, the reader 21 re-starts reading the normal playback video data. The process is then completed. According to the above-described procedure, even during the skipping playback operation, the video data can be correctly decoded in the decoding terminal 10 without causing an overflow or an underflow in the vbv buffer.

If it is found in step ST53 that the in-frame video data is located at the head of the closed GOP, the process proceeds to step ST55 in which the reader 21 re-starts reading the normal playback video data. The process is then completed.

A description is given below of the processing performed by the data converter 4 when a special playback designation signal indicating a frame-advance playback operation is input into the special playback controller 3.

Figure 17:
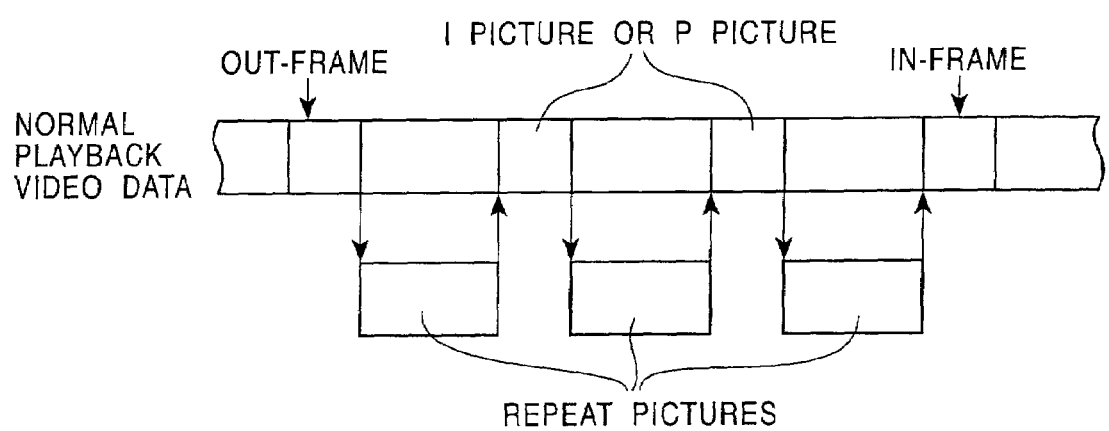
FIG. 17 illustrates processing executed by the data converter to perform a frame-advance playback operation.

In response to a special playback control signal indicating a frame-advance playback operation from the special playback controller 3, the data converter 4 selects I-pictures or P-pictures having a suitable length after the out-frame, as shown in FIG. 17, and inserts repeat pictures between the selected pictures. The data converter 4 then returns to the in-frame of the video data.

Figure 18:
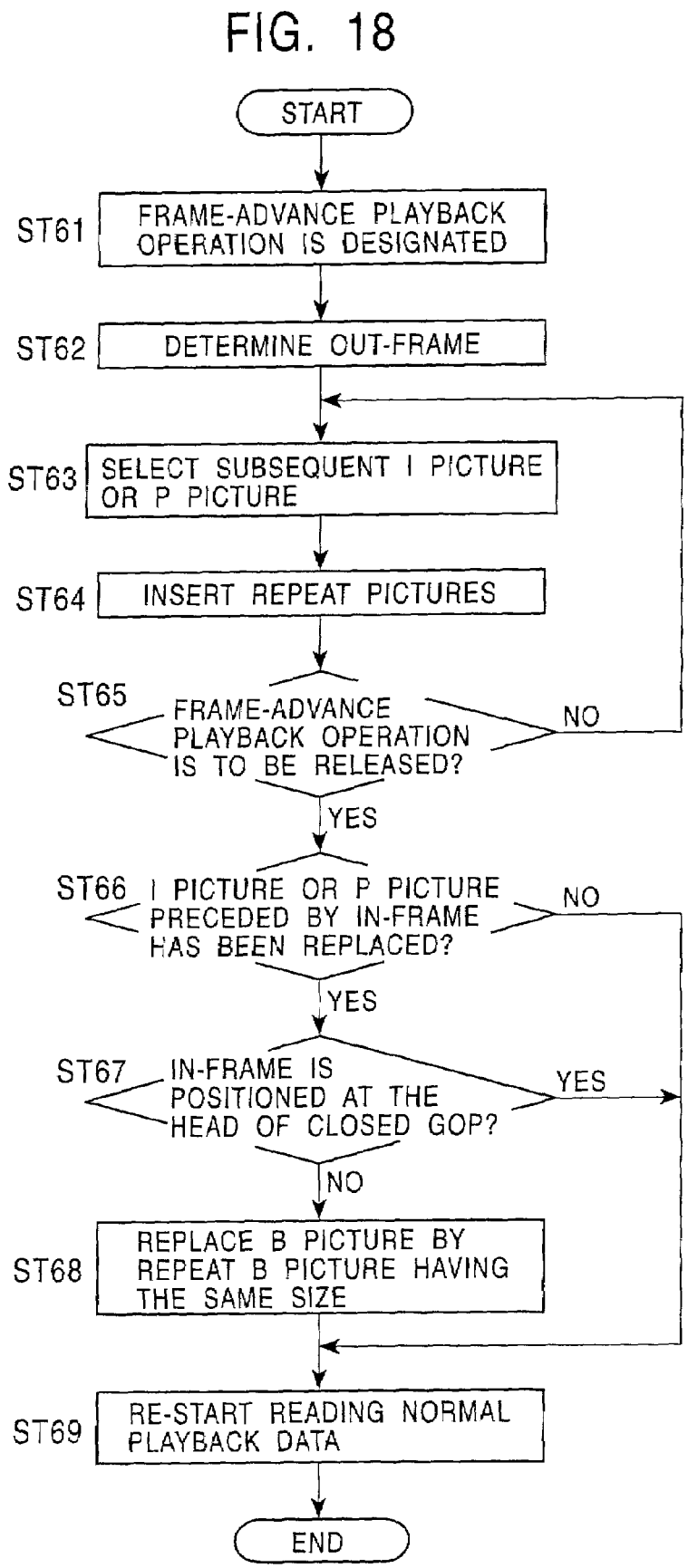
FIG. 18 is a flow chart illustrating a procedure of the processing taken by the data converter when the frame-advance playback operation is performed.
Figure 19:
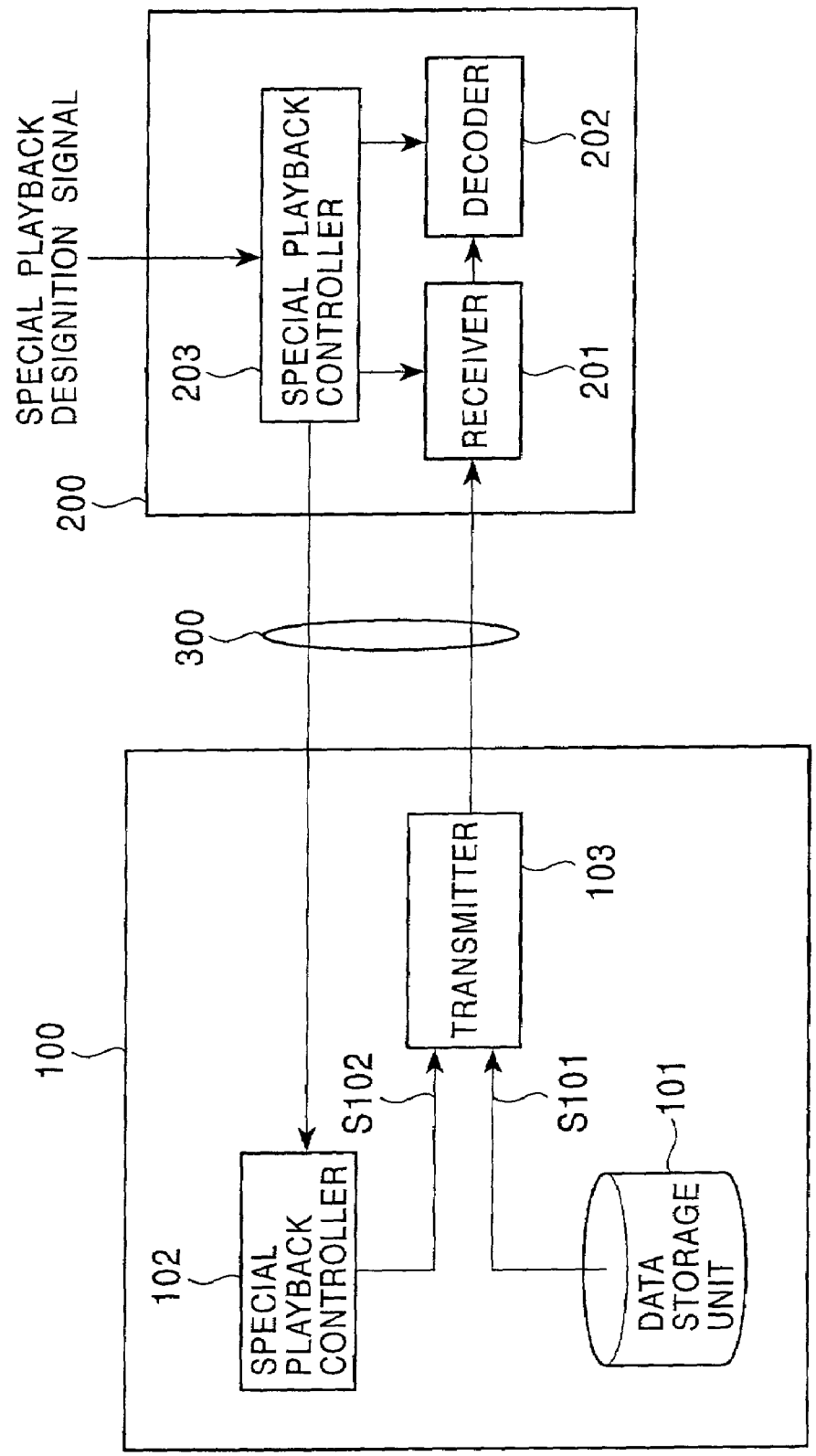
FIG. 19 is a block diagram illustrating a conventional data distribution system.
Figure 20:
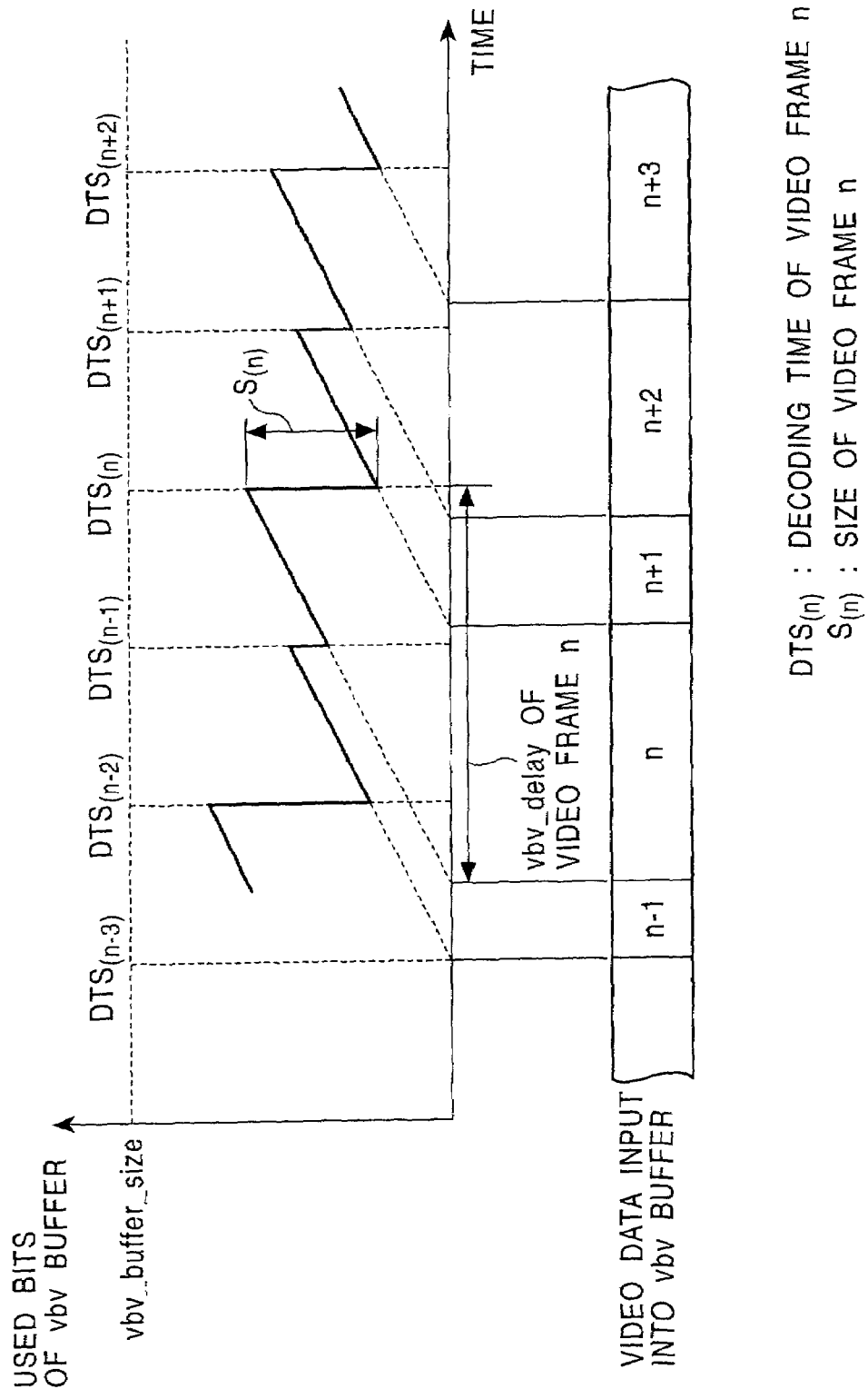
FIG. 20 illustrates the locus of used bits of a vbv buffer.
Figure 21:
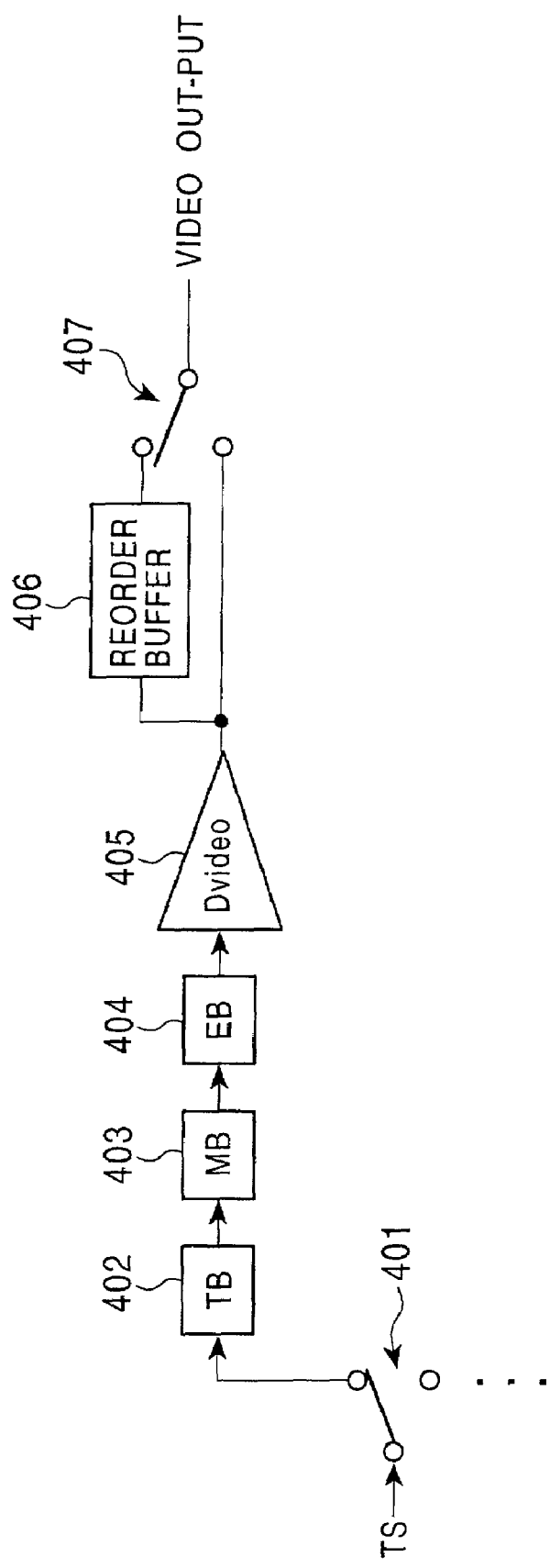
FIG. 21 illustrates a decoder model for decoding a TS according to ISO/IEC13818-1.

The procedure of this processing taken by the data converter 4 is shown in FIG. 18. In step ST61, the data converter 4 receives a special playback control signal designating a frame-advance playback operation while reading the normal playback video data by using the reader 21 and outputting them to the decoding terminal 10. Then, in step ST62, the reader 21 determines the out-frame. In this case, the reader 21 may select any picture of the normal playback video data as the out-frame. However, by selecting an I-picture as the out-frame, the image quality of the in-frame can be maintained at a high level.

Then, in step ST63, the reader 21 selects an I-picture or a P-picture (frame-advance playback video data) to be subsequently extracted from the normal playback video data. In this case, if P-pictures are selected as the frame-advance playback video data, it is necessary for the reader 21 to perform the following processing. If the picture which provides predictions to the P-picture is replaced by a repeat picture, the video data cannot be correctly decoded in the decoding terminal 10. Accordingly, it is necessary for the reader 21 to read the frame-advance playback video data from the data storage unit 2 so as to satisfy the condition that the I-picture or the P-picture immediately before the selected P-picture is not replaced by a repeat picture. For maintaining the image quality of the video data during the frame-advance playback operation at a high level, the reader 21 should select I-pictures as the frame-advance playback video data.

The reader 21 also reads repeat pictures from the data storage unit 2. In this case, by determining the number of repeat pictures, the reader 21 is able to adjust the interval between the frame-advance playback video data, thereby controlling the time duration of each picture.

The reader 21 then supplies the read frame-advance playback video data to the vbv delay detector 22, and also supplies the repeat pictures to the stuffing insertion unit 23.

Subsequently, in step ST64, the data converter 4 replaces the portions between the frame-advance playback video data selected in step S63 by all the repeat pictures. If the original pictures of the normal playback video data are I or P-pictures, the reader 21 reads repeat pictures from the data storage unit 2 so that the original pictures can be replaced by P-pictures. If the original pictures of the normal playback video data are B-pictures, the reader 21 reads repeat pictures from the data storage unit 2 so that the original pictures can be replaced by B-pictures. This enables the data converter 4 to maintain the display order for each picture type. For preventing an overflow or an underflow in the vbv buffer, the stuffing insertion unit 3 adds stuffing data to the repeat pictures so that the data size of the repeat pictures becomes equal to that of the original pictures.

It is then determined in step ST65 whether a special playback control signal indicating that the frame-advance playback operation is to be released is input. If the outcome of step ST65 is no, the processing in steps ST63 and ST64 is repeated until the above-described special playback control signal is input. If the result of step ST65 is yes, the process proceeds to step ST66.

In step ST66, a determination is made as to whether the I-picture or the P-picture immediately before the in-frame has been replaced by a repeat picture. If the outcome of step S66 is no, the process proceeds to step ST69 in which the reader 21 re-starts reading the normal playback video data. The process is then completed.

If the result of step ST66 is yes, processing similar to that in steps ST28 and ST29 shown in FIG. 10 is performed. More specifically, it is determined by the reader 21 in step ST67 whether the selected in-frame video data is located at the head of a closed GOP. If the outcome of step ST67 is yes, the process proceeds to step ST69 in which the reader 21 re-starts reading the normal playback video data. The process is then completed. If the result of step ST67 is no, the process proceeds to step ST68 in which the corresponding frames are replaced by repeat pictures having the same size. Then, in step ST69, the reader 21 re-starts reading the normal playback video data, and the process is completed.

If the input special playback control signal indicates that the speed of the frame-advance playback operation is not equal, the data converter 4 adjusts the number of repeat pictures so as to change the interval between the I-pictures or the P-pictures selected in step ST63. In this case, the data converter 4 reduces the repeat pictures which have replaced the original frames in step ST64, or add more repeat pictures. The data converter 4 also determines the data size of the repeat pictures in a manner similar to ST24 shown in FIG. 10.

If the frame-advance playback operation is performed in a backward direction, the data converter 4 arranges the I-pictures selected in step ST63 in a temporally reverse order.

In the above-described server 1, for generating special playback video data to be transmitted to the decoding terminal 10, repeat pictures are inserted into normal playback video data by adjusting the number and the size of the repeat pictures according to the type of special playback operation. Accordingly, the data format of the special playback video data is similar to that of the normal playback video data. This obviates the need for the decoding terminal 10 to perform special receiving and decoding processing. It is also not necessary to provide a special playback controller for the decoding terminal 10.

Additionally, when ISO/IEC13818-2 is used, the data converter 4 is able to perform control so as to prevent an overflow or an underflow in the vbv buffer while converting the normal playback video data into the special playback video data. Accordingly, the decoding terminal 10 can be simply constructed without the need for performing processing for the special playback operation.

As stated above, the data format of the special playback video data is similar to that of the normal playback video data. This also eliminates the need for the data converter 4 to possess a function of converting the data format into a special format. Since the special playback video data does not cause overflow or underflow in the vbv buffer, it can be multiplexed into a TS which satisfies the standards of ISO/IEC13818-1. The TS can be transmitted in a data format which satisfies the standards of IEC61883 via an IEEE-1394 cable used as the transmission medium 20.

Thus, according to the aforementioned data distribution system, a special server and a special decoding terminal are not required for transmitting special playback video data.

It is also not necessary to decode or encode video data when it is transmitted from the server 1. Thus, the configuration of the data converter 4 can be simplified, and a processing delay caused by data conversion can be inhibited. The image quality can also be maintained at a high level.

What is claimed is:

1. A data distribution apparatus comprising:
   receiving means for receiving a special playback request from an external source;
   data storage means for storing transmission data to be transmitted to a playback apparatus and insertion data to be transmitted to said playback apparatus together with the transmission data;
   reading means for reading the transmission data and the insertion data from said data storage means based on the special playback request received by said receiving means;
   used-bit detection means for detecting used bits of the transmission data and the insertion data which are read by said reading means and which occupy a virtual buffer used for controlling the amount of encoding;
   insertion-data adjusting means for adding extra data to the insertion data read by said reading means based on the used bits detected by said used-bit detection means so as to adjust the data size of the insertion data;
   switching means for selectively outputting the transmission data whose used bits which occupy the virtual buffer are detected by said used-bit detection means and the insertion data whose data size is adjusted by said insertion-data adjusting means based on the type of special playback operation indicated in the special playback request received by said receiving means; and
   transmission means for transmitting the transmission data and the insertion data output from said switching means to said playback apparatus.

2. A data distribution apparatus according to claim 1, wherein:
   the special playback request received by said receiving means designates an interrupting operation as the type of special playback operation;
   said reading means reads the insertion data as data for the interrupting operation from said data storage means; and
   said switching means outputs the insertion data read by said reading means to said transmission means as the interrupting operation data.

3. A data distribution apparatus according to claim 1, wherein:
   the special playback request received by said receiving means designates a fast-forward playback operation as the type of special playback operation;

said reading means reads the transmission data and the insertion data as data for the fast-forward playback operation from said data storage means; and said switching means outputs data obtained by inserting the insertion data read by said reading means between the transmission data to said transmission means as the fast-forward playback data.

4. A data distribution apparatus according to claim 3, wherein said reading means selects an intra-frame coded image or an inter-frame forward predictive coded image as the transmission data which forms the fast-forward playback data.

5. A data distribution apparatus according to claim 1, wherein:

the special playback request received by said receiving means designates a reverse playback operation as the type of special playback operation;

said reading means reads the transmission data and the insertion data as data for the reverse playback operation from said data storage means, and arranges the read transmission data in a temporally reverse order; and said switching means outputs data obtained by inserting the insertion data read by said reading means between the transmission data to said transmission means as the reverse playback data.

6. A data distribution apparatus according to claim 5, wherein said reading means selects an intra-frame coded image as the transmission data which forms the reverse playback data.

7. A data distribution apparatus according to claim 1, wherein:

the special playback request received by said receiving means designates a slow playback operation as the type of special playback operation;

said reading means reads the transmission data and the insertion data as data for the slow playback operation from said data storage means; and said switching means outputs data obtained by inserting the insertion data read by said reading means between the transmission data to said transmission means as the slow playback data.

8. A data distribution apparatus according to claim 7, wherein said reading means reads the insertion data by adjusting the number of frames of the insertion data according to the speed of the slow playback operation designated by the special playback request received by said receiving means.

9. A data distribution apparatus according to claim 1, wherein:

the special playback request received by said receiving means designates a skipping playback operation as the type of special playback operation;

said reading means reads the transmission data from where the skipping playback operation starts, the transmission data from where the skipping playback operation ends, and the insertion data from said data storage means; and said switching means outputs data obtained by inserting the insertion data read by said reading means between the transmission data from where the skipping playback operation starts and the transmission data from where the skipping playback operation ends to said transmission means as skipping playback data.

10. A data distribution apparatus according to claim 1, wherein:

the special playback request received by said receiving means designates a frame-advance playback operation as the type of special playback operation;

said reading means reads the transmission data and the insertion data as data for the frame-advance playback operation from said data storage means; and said switching means outputs data obtained by substituting part of the transmission data read by said reading means with the insertion data to said transmission means as the frame-advance playback data.

11. A data distribution apparatus according to claim 10, wherein said reading means selects an intra-frame coded image or an inter-frame forward predictive coded image as the transmission data which forms the frame-advance playback data.

12. A data distribution apparatus according to claim 10, wherein said reading means reads an inter-frame forward predictive coded image as the insertion data when the transmission data to be substituted by using said switching means is the intra-frame coded image or an inter-frame forward predictive coded image, or said reading means reads a bidirectionally predictive coded image as the insertion data when the transmission data to be substituted by using said switching means is a bidirectionally predictive coded image.

13. A data distribution apparatus according to claim 10, wherein said reading means reads the transmission data as the frame-advance playback data by adjusting the time duration of each frame selected from the transmission data according to the period of each frame of the frame-advance playback operation designated by the special playback request.

14. A data distribution apparatus according to claim 10, wherein said reading means reads the transmission data as the frame-advance playback data by adjusting the time duration of each frame selected from the transmission data according to the speed of the frame-advance playback operation designated by the special playback request, and also reads the insertion data which is inserted between the selected frames.

15. A data distribution apparatus according to claim 14, wherein said insertion-data adjusting means adds the extra data to the insertion data based on the used bits of the insertion data detected by said used-bit detection means and the used bits of the transmission data detected by said used-bit detection means.

16. A data distribution apparatus according to claim 1, wherein said reading means adjusts the period of a frame selected from the transmission data so as to control the speed of the special playback operation.

17. A data distribution apparatus according to claim 1, wherein, in response to the special playback request which designates the completion of the special playback operation, said reading means inserts the insertion data based on the used bits of the transmission data from which said reading means re-starts reading after the completion of the special playback operation.

18. A data distribution apparatus according to claim 1, wherein said reading means reads the insertion data from said data storage means so that continuous frames from the head of the transmission data displayed on said playback apparatus when the special playback operation is switched to a normal playback operation are substituted with the insertion data.

19. A data distribution apparatus according to claim 18, wherein said insertion-data adjusting means adjusts the insertion data so that the data size of the insertion data read by said reading means becomes equal to the data size of the transmission data before it is substituted.

20. A data distribution method comprising the steps of:
receiving a special playback request from an external source;
reading transmission data to be transmitted to a playback apparatus and insertion data to be transmitted to said playback apparatus together with the transmission data from data storage means in response to the received special playback request;
detecting used bits of the transmission data and the insertion data which occupy a virtual buffer used for controlling the amount of encoding;
adjusting the data size of the insertion data by adding extra data to the read insertion data based on the detected used bits;
selectively outputting the transmission data whose used bits which occupy the virtual buffer are detected and the insertion data whose data size is adjusted based on the type of special playback operation indicated in the received special playback request; and
transmitting the output transmission data and the insertion data to said playback apparatus.

21. A data distribution method according to claim 20, wherein:
the special playback request which designates an interrupting operation is received as the type of special playback operation;
the insertion data is read from said data storage means as data for the interrupting operation; and
the read insertion data is transmitted as the interrupting operation data.

22. A data distribution method according to claim 20, wherein:
the special playback request which designates a fast-forward playback operation is received as the type of special playback operation;
the transmission data and the insertion data are read from said data storage means as data for the fast-forward playback operation; and
data obtained by inserting the read insertion data between the transmission data is transmitted as the fast-forward playback data.

23. A data distribution method according to claim 22, wherein an intra-frame coded image or an inter-frame forward predictive coded image are selected as the transmission data which forms the fast-forward playback data.

24. A data distribution method according to claim 20, wherein:
the special playback request which designates a reverse playback operation is received as the type of special playback operation;
the transmission data and the insertion data are read from said data storage means as data for the reverse playback operation, and the read transmission data is arranged in a temporally reverse order; and
data obtained by inserting the read insertion data between the transmission data is transmitted as the reverse playback data.

25. A data distribution method according to claim 24, wherein an intra-frame coded image is selected as the transmission data which forms the reverse playback data.

26. A data distribution method according to claim 20, wherein:
the special playback request which designates a slow playback operation is received as the type of special playback operation;
the transmission data and the insertion data are read from said data storage means as data for the slow playback operation; and
data obtained by inserting the read insertion data between the transmission data is transmitted as the slow playback data.

27. A data distribution method according to claim 26, wherein the insertion data is read from said data storage means by adjusting the number of frames of the insertion data according to the speed of the slow playback operation designated by the received special playback request.

28. A data distribution method according to claim 20, wherein:
the special playback request which designates a skipping playback operation is received as the type of special playback operation;
the transmission data from where the skipping playback operation starts, the transmission data from where the skipping playback operation ends, and the insertion data are read from said data storage means; and
data obtained by inserting the read insertion data between the transmission data from where the skipping playback operation starts and the transmission data from where the skipping playback operation ends is transmitted as skipping playback data.

29. A data distribution method according to claim 20, wherein:
the special playback request which designates a frame-advance playback operation is received as the type of special playback operation;
the transmission data and the insertion data are read from said data storage means as data for the frame-advance playback operation; and
data obtained by substituting part of the read transmission data with the insertion data is transmitted as the frame-advance playback data.

30. A data distribution method according to claim 29, wherein an intra-frame coded image or an inter-frame forward predictive coded image is selected as the transmission data which forms the frame-advance playback data.

31. A data distribution method according to claim 29, wherein an inter-frame forward predictive coded image is read as the insertion data when the transmission data to be substituted by the insertion data is the intra-frame coded image or an inter-frame forward predictive coded image, or a bidirectionally predictive coded image is read as the insertion data when the transmission data to be substituted by the insertion data is a bidirectionally predictive coded image.

32. A data distribution method according to claim 29, wherein the transmission data is read as the frame-advance playback data by adjusting the time duration of each frame selected from the transmission data according to the period of each frame of the frame-advance playback operation designated by the received special playback request.

33. A data distribution method according to claim 29, wherein the transmission data is read as the frame-advance playback data by adjusting the time duration of each frame selected from the transmission data according to the speed of the frame-advance playback operation designated by the received special playback request, and also, the insertion data which is to be inserted between the selected frames is read.

34. A data distribution method according to claim 33, wherein the extra data is added to the insertion data based on the used bits of the read insertion data and the used bits of the read transmission data.

35. A data distribution method according to claim 20, wherein the speed of the special playback operation is controlled by adjusting the interval of frames selected from the transmission data.

36. A data distribution method according to claim 20, wherein, in response to the special playback request which designates the completion of the special playback operation, the insertion data is inserted based on the used bits of the transmission data from which a reading operation is restarted after the completion of the special playback operation.

37. A data distribution method according to claim 20, wherein the insertion data is read from said data storage means so that continuous frames from the head of the transmission data displayed on said playback apparatus when the special playback operation is switched to a normal playback operation are substituted with the insertion data.

38. A data distribution method according to claim 37, wherein the read insertion data is adjusted so that the data size of the read insertion data becomes equal to the data size of the transmission data before it is substituted.

39. A data distribution system comprising a data distribution apparatus for distributing data and a receiving terminal for receiving the data from said data distribution apparatus, said distribution apparatus and said receiving terminal being connected via a transmission medium, said data distribution apparatus comprising:

receiving means for receiving a special playback request from a user;

data storage means for storing transmission data to be transmitted to said receiving terminal and insertion data to be transmitted to said receiving terminal together with the transmission data;

reading means for reading the transmission data and the insertion data from said data storage means based on the special playback request received by said receiving means;

used-bit detection means for detecting used bits of the transmission data and the insertion data which are read by said reading means and which occupy a virtual buffer used for controlling the amount of encoding;

insertion-data adjusting means for adding extra data to the insertion data read by said reading means based on the used bits detected by said used-bit detection means so as to adjust the data size of the insertion data;

switching means for selectively outputting the transmission data whose used bits which occupy the virtual buffer are detected by said used-bit detection means and the insertion data whose data size is adjusted by said insertion-data adjusting means based on the type of special playback operation indicated in the special playback request received by said receiving means; and transmission means for transmitting the transmission data and the insertion data output from said switching means to said receiving terminal; and said receiving terminal comprising:

receiving means for receiving the transmission data and the insertion data from said transmission means based on the special playback request as special playback data; and decoding means for decoding the special playback data received by said receiving means.

* * * * *